US008165287B2

(12) United States Patent
Ghouti et al.

(10) Patent No.: US 8,165,287 B2
(45) Date of Patent: Apr. 24, 2012

(54) CRYPTOGRAPHIC HASH FUNCTIONS USING ELLIPTIC POLYNOMIAL CRYPTOGRAPHY

(75) Inventors: Lahouari Ghouti, Dhahran (SA); Mohammad K. Ibrahim, Leicester (GB); Atef J. Al-Najjar, Dhahran (SA)

(73) Assignee: King Fahd University of Petroleum & Minerals, Dhahran (SA)

( * ) Notice: Subject to any disclaimer, the term of this patent is extended or adjusted under 35 U.S.C. 154(b) by 786 days.

(21) Appl. No.: 12/318,495

(22) Filed: Dec. 30, 2008

(65) Prior Publication Data

US 2010/0166175 A1    Jul. 1, 2010

(51) Int. Cl.
*H04L 29/06* (2006.01)
(52) U.S. Cl. ............ 380/28; 380/29; 708/200; 708/490; 708/492; 713/168; 713/170
(58) Field of Classification Search .................... 380/28, 380/29; 708/200, 490, 492; 713/168, 170
See application file for complete search history.

(56) References Cited

U.S. PATENT DOCUMENTS

| | | | |
|---|---|---|---|
| 4,424,414 A | 1/1984 | Hellman et al. | |
| 4,668,103 A | 5/1987 | Wilson | |
| 4,995,082 A | 2/1991 | Schnorr | |
| 5,010,573 A | 4/1991 | Musyck et al. | |
| 5,054,066 A | 10/1991 | Riek et al. | |
| 5,146,500 A | 9/1992 | Maurer | |
| 5,150,411 A | 9/1992 | Maurer | |
| 5,272,755 A | 12/1993 | Miyaji et al. | |
| 6,307,935 B1 * | 10/2001 | Crandall et al. | 380/28 |
| 6,816,594 B1 | 11/2004 | Okeya | |
| 7,483,533 B2 * | 1/2009 | Ibrahim | 380/44 |
| 7,483,534 B2 * | 1/2009 | Ibrahim | 380/44 |
| 7,813,512 B2 * | 10/2010 | Futa et al. | 380/285 |
| 2003/0072443 A1 | 4/2003 | Harley et al. | |
| 2007/0291934 A1 * | 12/2007 | Volkovs et al. | 380/28 |
| 2010/0111296 A1 * | 5/2010 | Brown et al. | 380/28 |
| 2010/0166174 A1 * | 7/2010 | Ghouti et al. | 380/28 |
| 2010/0166176 A1 * | 7/2010 | Ghouti et al. | 380/29 |
| 2010/0169644 A1 * | 7/2010 | Ghouti et al. | 713/169 |
| 2010/0177890 A1 * | 7/2010 | Ghouti et al. | 380/30 |
| 2010/0208884 A1 * | 8/2010 | Joye | 380/28 |
| 2011/0200185 A1 * | 8/2011 | Ghouti et al. | 380/28 |
| 2011/0200187 A1 * | 8/2011 | Ghouti et al. | 380/43 |
| 2011/0200188 A1 * | 8/2011 | Ghouti et al. | 380/43 |
| 2011/0202773 A1 * | 8/2011 | Ghouti et al. | 713/183 |
| 2011/0274269 A1 * | 11/2011 | Icart | 380/28 |

FOREIGN PATENT DOCUMENTS

| | | |
|---|---|---|
| EP | 0874307 | 10/1998 |
| EP | 0892520 | 1/1999 |
| EP | 1215642 | 6/2002 |

* cited by examiner

*Primary Examiner* — Nathan Flynn
*Assistant Examiner* — Sarah Su
(74) *Attorney, Agent, or Firm* — Richard C. Litman

(57) ABSTRACT

The cryptographic hash functions using of elliptic polynomial polynomials are based on the elliptic polynomial discrete logarithm problem, which is well known as a computationally hard problem. The hash functions are based on the elliptic polynomial equation in their generation, where different elliptic polynomials are used for different blocks of the same plain text. Particularly, the hash functions use an elliptic polynomial with more than one independent x-coordinate. More specifically, a set of elliptic polynomial points are used that satisfy an elliptic polynomial equation with more than one independent x-coordinate which is defined over a finite field F.

18 Claims, No Drawings

CRYPTOGRAPHIC HASH FUNCTIONS USING ELLIPTIC POLYNOMIAL CRYPTOGRAPHY

BACKGROUND OF THE INVENTION

1. Field of the Invention

The present invention relates to encrypted data communications in computer networks or other electronic communications, and in particular, to cryptographic hash functions using elliptic polynomial cryptography.

2. Description of the Related Art

Cryptographic hash functions have many applications in electronic communications over a computer network. Such hash functions are sometimes referred to as "cryptographic checksums." The cryptographic hash functions compresses a plaintext message of any length to a message digest (number) or hash value of fixed bit length. The hash value can then be encrypted with a secret key and sent with the plaintext or encrypted plaintext message. The receiver of the communication can apply the same hash function to the received message compute a hash value and apply the secret key to decrypt the received hash value. If the hash value computed for the received message is the same as the decrypted hash value, the genuineness and authenticity of the message are confirmed.

Since the hash value is much shorter and therefore quicker to encrypt than the complete plaintext message, hash functions are often used for digital signatures. Hash functions may also be used to encrypt messages, and are sometimes used for verification of passwords, e.g., in UNIX systems, and in various other cryptographic applications for electronic communications.

Hash functions should meet certain requirements to ensure security. It should be possible to compute the message digest or hash value quickly. Hash functions should be deterministic, i.e., the message m and hash function H should produce one and only one hash value $y=H(m)$. A hash function should be a one-way function, i.e., given a message m and a hash function H so that the hash value or message digest $y=H(m)$, it should be computationally infeasible to reconstruct the message m from the hash value y; indeed, given the hash value y, it should be computationally infeasible to find any message m' so that hash function H produces $y=H(m')$ (pre-image resistance). Further, it should be computationally infeasible to find two messages $m_1 \neq m_2$ so that hash function H produces $H(m_1)=H(m_2)$ (weakly collision-free or second preimage resistant). For some applications, it is also desirable that it be computationally infeasible to find any two messages so that $H(m_7)=H(m_2)$ (strongly collision-free).

The most commonly used hash functions include the MDx class, such as MD5, the SHA class, including SHA-1, and the RIPEMD function, e.g., the RIPEMD-160 hash function. Such hash functions rely upon sequential and iterated structures, block ciphers, or computationally hard problems involving integer factorization. Recently, however, concerns have been raised concerning the security of such hash functions, as successful attacks on either the overall hash function or the compression function, or collisions with the hash values, have been reported.

Thus, cryptographic hash functions using elliptic polynomial cryptography solving the aforementioned problems is desired.

SUMMARY OF THE INVENTION

The cryptographic hash functions using elliptic polynomial cryptography are based on the elliptic polynomial discrete logarithm problem. It is well known: that an elliptic polynomial discrete logarithm problem is a computationally hard problem.

The hash functions to be described below are based on the elliptic polynomial equation in their generation, where different elliptic polynomials are used for different blocks of the same plaintext. Particularly, the hash functions use an elliptic polynomial with more than one independent x-coordinate. More specifically, a set of elliptic polynomial points are used which satisfy an elliptic polynomial equation with more than one independent x-coordinate which is defined over a finite field F having the following properties: One of the variables (the y-coordinate) has a maximum degree of two, and appears on its own in only one of the monomials; the other variables (the x-coordinates) have a maximum degree of three, and each must appear in at least one of the monomials with a degree of three; and all monomials which contain x-coordinates must have a total degree of three.

The group of points of the elliptic polynomial with the above form is defined over additions in the extended dimensional space and, as will be described in detail below, the inventive method makes use of elliptic polynomial hopping where different elliptic polynomials are used for different blocks of the same plaintext.

The method of generating hash functions for elliptic polynomial cryptography includes the steps of: (a) generating a set, of hash function parameters, including: (b) establishing a two-dimensional Cartesian coordinate system having orthogonal coordinates x and y, establishing natural numbers n and N, wherein a message string to be encrypted is divided into N bit strings, and establishing a finite field F, an elliptic polynomial EC and a twist of the elliptic polynomial TEC; (c) specifying values of nx and ny, and a set of coefficients $a_{1k}$, $a_{2kl}$, $a_{3k}$, $c_{1lki}$, $c_{2kl}$, $c_{3kli}$, $b_{1l}$, $b_{2lk}$, $b_{3lk}$, $b_{4k}$, $b_c \in F$, along with a base point on an elliptic polynomial $(x_{0,B}, x_{1,B}, \ldots, x_{nx,B}, y_{0,B}, y_{1,B}, \ldots, y_{ny,B}) \in EC^{xn+ny+2}$ and a base point on the twist of the elliptic polynomial $(x_{0,TB}, x_{1,TB}, \ldots, x_{nx,TB}, \sqrt{\alpha}y_{0,B}, y_{1,TB}, \ldots, y_{ny,TB}) \in TEC^{xn+ny+2}$; (d) disclosing the values of nx and ny, the set of coefficients, the base point on the elliptic polynomial and the base point on the twist as public information; (e) selecting a pair of random number scalars $k_1$, $k_2$ which are kept secret for a specific hash function to be used; (f) computing the multiplication of the scalar $k_1$ with a point $(x_{0,B}, x_{1,B}, \ldots, x_{nx,B}, y_{0,B}, y_{1,B}, \ldots, y_{ny,B})$ to obtain a scalar multiplication such that $(x_{0,Pu}, x_{1,Pu}, \ldots, x_{nx,Pu}, y_{0,Pu}, y_{1,Pu}, \ldots, y_{ny,Pu}) = k_1(x_{0,B}, x_{1,B}, \ldots, x_{nx,B}, y_{0,B}, y_{1,B}, \ldots, y_{ny,B})$; (g) computing the multiplication of the scalar $k_2$ with a point $(x_{0,TB}, x_{1,TB}, \ldots, x_{nx,TB}, \sqrt{\alpha}y_{0,B}, y_{1,TB}, \ldots, y_{ny,TB})$ to obtain a scalar multiplication such that $(x_{0,TPu}, x_{1,TPu}, \ldots, x_{nx,TPu}, \sqrt{\alpha}y_{0,TPu}, y_{1,TPu}, \ldots, y_{ny,TPu}) = k_1(x_{0,TB}, x_{1,TB}, \ldots, x_{nx,TB}, \sqrt{\alpha}y_{0,B}, y_{1,TB}, \ldots, y_{ny,TB})$; (h) disclosing the scalar multiplication points $(x_{0,Pu}, x_{1,Pu}, \ldots, x_{nx,Pu}, y_{0,Pu}, y_{1,Pu}, \ldots, y_{ny,Pu})$ and $(x_{0,TPu}, x_{1,TPu}, \ldots, x_{nx,TPu}, \sqrt{\alpha}y_{0,TPu}, y_{1,TPu}, \ldots, y_{ny,TPu})$ as public information; (i) generating a hash bit string of the message bit string, including: (j) pre-processing the message bit string to obtain a bit string which is a multiple of $(nx+ny+1)N$-bit; (k) computing an initial hash point $(x_{0,c_1}, x_{1,c_1}, \ldots, x_{nx,c_1}, y_{0,c_1}, y_{1,c_1}, \ldots, y_{ny,c_1})$ on the elliptic polynomial by multiplying a scalar integer value $k_{m_0}$ of the $(nx+ny+1)N$-bit string of an initial block of the message bit string with a point $(x_{0,Pu}, x_{1,Pu}, \ldots, x_{nx,Pu}, y_{0,Pu}, y_{1,Pu}, \ldots, y_{ny,Pu})$ such that: $(x_{0,c_1}, x_{1,c_1}, \ldots, x_{nx,c_1}, y_{0,c_1}, y_{1,c_1}, \ldots, y_{ny,c_1}) = k_{m_0}(x_{0,Pu}, x_{1,Pu}, \ldots, x_{nx,Pu}, y_{0,Pu}, y_{1,Pu}, \ldots, y_{ny,Pu})$; (l) computing an initial hash point $(x_{0,Tc_1}, x_{1,Tc_1}, \ldots, x_{nx,Tc_1}, \sqrt{\alpha}y_{0,Tc_1}, y_{1,Tc_1}, \ldots, y_{ny,Tc_1})$ on the twist of the elliptic polynomial by multiplying a scalar integer value $k_{m_1}$ of the $(nx+ny+1)N$-bit string of the next block of the message bit string with a point $(x_{0,TPu}, x_{1,TPu}, \ldots, x_{nx,TPu}, \sqrt{\alpha}y_{0,TPu}, y_{1,TPu}, \ldots, y_{ny,TPu})$ such that: $(x_{0,Tc_1}, x_{1,Tc_1}, \ldots, x_{nx,Tc_1}, \sqrt{\alpha}y_{0,Tc_1}, y_{1,Tc_1}, \ldots, y_{ny,Tc_1})=k_{m_1}(x_{0,TPu}, x_{1,TPu}, \ldots, x_{nx,TPu}, \sqrt{\alpha}y_{0,TPu}, y_{1,TPu}, \ldots, y_{ny,TPu})$; (m) establishing integer values i and u with an initial value of i=2, and repeating the following steps n) and o) until i>u: (n) embedding a $(nx+ny+1)N$-bit string of the $i^{th}$ block of the message bit string into $(nx+1)$ x-coordinates $x_0, x_1, \ldots, x_{nx}$ and ny y-coordinates $y_1, \ldots, y_{ny}$ of the elliptic message point $(x_{0,m_i}, x_{1,m_i}, \ldots, x_{nx,m_i}, \sqrt{\alpha_{m_i}}y_{0,m_i}, y_{1,m_i}, \ldots, y_{ny,m_i})$ using non-iterative embedding; (o) if the message point of the $i^{th}$ block is on the elliptic polynomial then computing the hash points as: $(x_{0,c_i}, x_{1,c_i}, \ldots, x_{nx,c_i}, y_{0,c_i}, y_{1,c_i}, \ldots, y_{ny,c_i})=(x_{0,m_i}, x_{1,m_i}, \ldots, x_{nx,m_i}, y_{0,m_i}, y_{1,m_i}, \ldots, y_{ny,m_i})+(x_{0,c_{i-1}}, x_{1,c_{i-1}}, \ldots, x_{nx,c_{i-1}}, y_{0,c_{i-1}}, y_{1,c_{i-1}}, \ldots, x_{ny,c_{i-1}})$ and $(x_{0,Tc_i}, x_{1,Tc_i}, \ldots, x_{nx,Tc_i}, \sqrt{\alpha}y_{0,Tc_i}, y_{1,Tc_i}, \ldots, y_{ny,Tc_i})=(x_{0,Tc_{i-1}}, x_{1,Tc_{i-1}}, \ldots, x_{nx,Tc_{i-1}}, \sqrt{\alpha}y_{0,Tc_{i-1}}, y_{1,Tc_{i-1}}, \ldots, x_{ny,Tc_{i-1}})$, otherwise, computing the hash points as: $(x_{0,Tc_i}, x_{1,Tc_i}, \ldots, x_{nx,Tc_i}, \sqrt{\alpha}y_{0,Tc_i}, y_{1,Tc_i}, \ldots, y_{ny,Tc_i})=(x_{0,m_i}, x_{1,m_i}, \ldots, x_{nx,m_i}, \sqrt{\alpha}y_{0,m_i}, y_{1,m_i}, \ldots, y_{ny,m_i})+(x_{0,Tc_{i-1}}, x_{1,Tc_{i-1}}, \ldots, x_{nx,Tc_{i-1}}, \sqrt{\alpha}y_{0,Tc_{i-1}}, y_{1,Tc_{i-1}}, \ldots, x_{ny,Tc_{i-1}})$ and $(x_{0,c_i}, x_{1,c_i}, \ldots, x_{nx,c_i}, y_{0,c_i}, y_{1,c_i}, \ldots, y_{ny,c_i})=(x_{0,c_{i-1}}, x_{1,c_{i-1}}, \ldots, x_{nx,c_{i-1}}, y_{0,c_{i-1}}, y_{1,c_{i-1}}, \ldots, x_{ny,c_{i-1}})$ and (p) concatenating the appropriate bits of the x-coordinates $x_{0,c}, x_{1,c}, \ldots, x_{nx,c}$, the y-coordinates $y_{1,c}, \ldots, y_{nx,c}$ and a sign bit of $y_{0,c}$ of the hash point $(x_{0,c_u}, x_{1,c_u}, \ldots, x_{nx,c_u}, y_{0,c_u}, y_{1,c_u}, \ldots, y_{ny,c_u})$, and the appropriate bits of the x-coordinates $x_{0,Tc}, x_{1,Tc}, \ldots, x_{nx,Tc}$, the y-coordinates $y_{1,Tc}, \ldots, y_{ny,Tc}$ and a sign bit of $y_{0,Tc}$ of the hash point $(x_{0,Tc_u}, x_{1,Tc_u}, \ldots, x_{nx,Tc_u}, \sqrt{\alpha}y_{0,Tc_u}, y_{1,Tc_u}, \ldots, y_{ny,Tc_u})$ to form the hash bit string.

These and other features of the present invention will become readily apparent upon further review of the following specification and drawings.

DETAILED DESCRIPTION OF THE PREFERRED EMBODIMENTS

The cryptographic hash functions using elliptic polynomial cryptography are based on the elliptic polynomial discrete logarithm problem. It is well known that an elliptic polynomial discrete logarithm problem is a computationally hard problem, as described above.

The hash functions to be described below are based on the elliptic polynomial equation in their generation, where different elliptic polynomials are used for different blocks of the same plaintext. Particularly, the hash functions use an elliptic polynomial with more than one independent x-coordinate. More specifically, a set of elliptic polynomial points are used which satisfy an elliptic polynomial equation with more than one independent x-coordinate which is defined over a finite field F having the following properties: One of the variables (the y-coordinate) has a maximum degree of two, and appears on its own in only one of the monomials; the other variables (the x-coordinates) have a maximum degree of three, and each must appear in at least one of the monomials with a degree of three; and all monomials which contain x-coordinates must have a total degree of three.

The group of points of the elliptic polynomial with the above form is defined over additions in the extended dimensional space and, as will be described in detail below, the inventive method makes use of elliptic polynomial hopping where different elliptic polynomials are used for different blocks of the same plaintext.

The particular advantage of using elliptic polynomial cryptography with more than one x-coordinate is that additional x-coordinates are used to embed extra message data bits in a single elliptic point that satisfies the elliptic polynomial equation. Given that nx additional x-coordinates are used, with nx being greater than or equal to one, a resulting elliptic point has $(nx+1)$ x-coordinates, where all coordinates are elements of the finite field F. The number of points which satisfy an elliptic polynomial equation with nx additional x-coordinates defined over F and which can be used in the corresponding cryptosystem is increased by a factor of $(\#f)^{nx}$, where $\#$ denotes the size of a field.

Through the use of this particular method, security is increased through the usage of different elliptic polynomials for different message blocks during the generation of a message hash. Further, each elliptic polynomial used for each message block is selected at random, preferably using an initial value and a random number generator.

Given the form of the elliptic polynomial equation described above, the elliptic polynomial and its twist are isomorphic with respect to one another. The inventive method uses an embedding technique, to be described in greater detail below, which allows the embedding of a bit string into the x-coordinates of an elliptic polynomial point in a deterministic and non-iterative manner when the elliptic polynomial has the above described form. This embedding method overcomes the disadvantage of the time overhead of the iterative embedding methods used in existing elliptic polynomial.

The difficulty of using conventional elliptic polynomial cryptography to develop hash functions typically lies in the iterative and non-deterministic method needed to embed a bit string into an elliptic polynomial point, which has the drawback of the number of iterations needed being different for different bit strings which are being embedded. As a consequence, different hash times are required for different blocks of bit strings. Such a data-dependant generation time is not suitable for generating hash functions, which require data independent encryption time. Further, with regard to iterative and non-deterministic methods in conventional elliptic polynomial cryptography, given an elliptic polynomial defined over a finite field that needs N-bits for the representation of its elements, only $((nx+ny+1)N-L)$ bits of the message data bits can be embedded in any elliptic polynomial point.

The isomorphic relationship between an elliptic polynomial and its twist, which is obtained as a result of the given form of the elliptic polynomial equation, ensures that any bit string whose equivalent binary value is an element of the underlying finite field has a bijective relationship between the bit string and a point which is either on the elliptic polynomial or its twist. This bijective relationship allows for the development of the elliptic polynomial hopping based hash functions to be described below.

In the conventional approach to elliptic polynomial cryptography, the security of the resulting cryptosystem relies on breaking the elliptic polynomial discrete logarithm problem, which can be summarized as: given the points $k(x_{0,B}, x_{1,B}, \ldots, x_{nx,B}, y_B)$ and $(x_{0,B}, x_{1,B}, \ldots, x_{nx,B}, y_B)$, find the scalar k.

As will be described below, different elliptic polynomials are used for each block of the message data, where each elliptic polynomial used for each message block is selected at random using an initial value and a random number generator. Since the elliptic polynomial used for each message block is not known, this makes the elliptic polynomial discrete logarithm problem far more difficult to solve, since the attacker does not know the elliptic polynomial coefficients that are needed in order to compute point additions and point doublings.

Further, projective coordinates are used at the sending and receiving entities in order to eliminate inversion or division during each point addition and doubling operation of the scalar multiplication. It should be noted that all of the elliptic polynomial cryptography-based hash functions disclosed herein are scalable.

In the following, with regard to elliptic polynomials, the "degree" of a variable $u^i$ is simply the exponent i. A polynomial is defined as the sum of several terms, which are herein referred to as "monomials", and the total degree of a monomial $u^i v^j w^k$ is given by (i+j+k). Further, in the following, the symbol $\epsilon$ denotes set membership.

One form of the subject elliptic polynomial equation with more than one x-coordinate and one or more y-coordinates is defined as follows: the elliptic polynomial is a polynomial with more than two independent variables such that the maximum total degree of any monomial in the polynomial is three; at least two or more of the variables, termed the x-coordinates, have a maximum degree of three, and each must appear in at least one of the monomials with a degree of three; and at least one or more variables, termed the y-coordinates, have a maximum degree of two, and each must appear in at least one of the monomials with a degree of two.

Letting $S_{nx}$ represents the set of numbers from 0 to nx (i.e., $S_{nx}=\{0, \ldots, nx\}$), and letting $S_{ny}$ represents the set of numbers from 0 to ny (i.e., $S_{ny}=\{0, \ldots, ny\}$), and further setting $(nx+ny) \geq 1$, then, given a finite field, F, the following equation defined over F is one example of the polynomial described above:

$$\sum_{k \in S_{ny}} a_{1k} y_k^2 + \sum_{k,l \in S_{ny}, l \neq k} a_{2kl} y_k y_l + \qquad (1)$$
$$\sum_{k \in S_{ny}} a_{3k} y_k + \sum_{k,l \in S_{ny}, i \in S_{nx}} c_{1kli} y_k y_l x_i +$$
$$\sum_{k \in S_{ny}, l \in S_{nx}} c_{2kl} y_k x_l + \sum_{k \in S_{ny}, l,i \in S_{nx}} c_{3kli} y_k x_l x_i =$$
$$\sum_{l \in S_{nx}} b_{1l} x_l^3 + \sum_{l,k \in S_{nx}, l \neq k} b_{2lk} x_l^2 x_k + \sum_{l,k \in S_{nx}} b_{3lk} x_l x_k + \sum_{k \in S_{nx}} b_{4k} x_k + b_c,$$

where $a_{1l}, a_{2kl}, a_{3k}, c_{1lki}, c_{2kl}, c_{3kli}, b_{1l}, b_{2lk}, b_{3lk}, b_{4k}$ & $b_c \in F$.

Two possible examples of equation (1) are $y_0^2 = x_0^3 + x_1^3 + x_0 x_1$ and $y_0^2 + x_0 x_1 y_0 + y_0 = x_0^3 + x_1^3 + x_0^2 x_1 + x_0 x_1^2 + x_0 x_1 + x_0 + x_1$.

With regard to the use of the elliptic polynomial equation in the addition of points of an elliptic polynomial with more than one x-coordinate and one or more y-coordinates, we may examine specific coefficients $a_{1k}, a_{2kl}, a_{3k}, c_{1lki}, c_{2kl}, c_{3kli}, b_{1l}, b_{2lk}, b_{3lk}, b_{4k}, b_c \in F$ for F, wherein a set of points $EC^{nx+ny+2}$ is defined as the (nx+ny+2)-tuple $(x_0, x_1, \ldots, x_{nx}, y_0, y_1, \ldots, y_{ny})$, where $x_i, y_k \in F$, $i \in S_{nx}$ and $k \in S_{ny}$. This set of points are solutions of F, though excluding the point (0, 0, 0) and the point at infinity, $(x_{0,I}, x_{1,I}, \ldots, x_{nx,I}, y_{1,I}, \ldots, y_{ny,I})$.

The rules for conventional elliptic polynomial point addition may be adopted to define an additive binary operation, "+", over $EC^{nx+ny+2}$; i.e., for all $(x_{0,1}, x_{1,1}, \ldots, x_{nx,1}, y_{0,1}, y_{1,1}, \ldots, y_{ny,1}) \in EC^{nx+ny+2}$ and $(x_{0,2}, x_{1,2}, \ldots, x_{nx,2}, y_{0,2}, y_{1,2}, \ldots, y_{ny,2}) \in EC^{nx+ny+2}$, the sum, $(x_{0,3}, x_{1,3}, \ldots, x_{nx,3}, y_{0,3}, y_{1,3}, \ldots, y_{ny,3}) = (x_{0,1}, x_{1,1}, \ldots, x_{nx,1}, y_{0,1}, y_{1,1}, \ldots, y_{ny,1}) + (x_{0,2}, x_{1,2}, \ldots, x_{nx,2}, y_{0,2}, y_{1,2}, \ldots, y_{ny,2})$ is also $(x_{0,3}, x_{1,3}, \ldots, x_{nx,3}, y_{0,3}, y_{1,3}, \ldots, y_{ny,3}) \in EC^{nx+ny+2}$.

As will be described in greater detail below, $(EC^{nx+ny+2}, +)$ forms a pseudo-group (p-group) over addition that satisfies the following axioms:

(i) There exists a set $(x_{0,I}, x_{1,I}, \ldots, x_{nx,I}, y_{0,I}, y_{1,I}, \ldots, y_{ny,I}) \in EC^{nx+ny+2}$ such that $(x_0, x_1, \ldots, x_{nx}, y_0, y_1, \ldots, y_{ny}) + (x_{0,I}, x_{1,I}, \ldots, x_{nx,I}, y_{0,I}, y_{1,I}, \ldots, y_{ny,I}) = (x_0, x_1, \ldots, x_{nx}, y_0, y_1, \ldots, y_{ny})$ for all $(x_0, x_1, \ldots, x_{nx}, y_0, y_1, \ldots, y_{ny}) \in EC^{nx+ny+2}$;

(ii) for every set $(x_0, x_1, \ldots, x_{nx}, y_0, y_1, \ldots, y_{ny}) \in EC^{nx+ny+2}$, there exists an inverse set, $-(x_0, x_1, \ldots, x_{nx}, y_0, y_1, \ldots, y_{ny}) \in EC^{nx+ny+2}$, such that $(x_0, x_1, \ldots, x_{nx}, y_0, y_1, \ldots, y_{ny}) - (x_0, x_1, \ldots, x_{nx}, y_0, y_1, \ldots, y_{ny}) = (x_{0,I}, x_{1,I}, \ldots, x_{nx,I}, y_{0,I}, y_{1,I}, \ldots, y_{ny,I})$;

(iii) the additive binary operation in $(EC^{nx+ny+2}, +)$ is commutative, and the p-group $(EC^{nx+ny+2}, +)$ forms a group over addition when;

(iv) the additive binary operation in $(EC^{nx+ny+2}, +)$ is associative.

Prior to a more detailed analysis of the above axioms, the concept of point equivalence must be further developed. Mappings can be used to indicate that an elliptic point represented using (nx+1) x-coordinates and (ny+1) y-coordinates, $(x_0, x_1, \ldots, x_{nx}, y_0, y_1, \ldots, y_{ny})$, is equivalent to one or more elliptic points that satisfy the same elliptic polynomial equation, including the equivalence of an elliptic point to itself.

Points that are equivalent to one another can be substituted for each other at random, or according to certain rules during point addition and/or point doubling operations. For example, the addition of two points and $(x_{0,1}, x_{1,1}, \ldots, x_{nx,1}, y_{0,1}, y_{1,1}, \ldots, y_{ny,1})$ and $(x_{0,2}, x_{1,2}, \ldots, x_{nx,2}, y_{0,2}, y_{1,2}, \ldots, y_{ny,2})$ is $(x_{0,3}, x_{1,3}, \ldots, x_{nx,3}, y_{0,3}, y_{1,3}, \ldots, y_{ny,3}) = (x_{0,2}, x_{1,2}, \ldots, x_{nx,2}, y_{0,2}, y_{1,2}, \ldots, y_{ny,2})$ is given by $(x_{0,3}, x_{1,3}, \ldots, x_{nx,3}, y_{0,3}, y_{1,3}, \ldots, y_{ny,3}) = (x_{0,1}, x_{1,1}, \ldots, x_{nx,1}, y_{0,1}, y_{1,1}, \ldots, y_{ny,1}) + (x_{0,2}, x_{1,2}, \ldots, x_{nx,2}, y_{0,2}, y_{1,2}, \ldots, y_{ny,2})$ If the point $(x_{0,1}", x_{1,1}", \ldots, x_{nx,1}", y_{0,1}", y_{1,1}", \ldots, y_{ny,1}")$ is equivalent to the point $(x_{0,1}, x_{1,1}, \ldots, x_{nx,1}, y_{0,1}, y_{1,1}, \ldots, y_{ny,1})$, then the former can be substituted for $(x_{0,1}, x_{1,1}, \ldots, x_{nx,1}, y_{0,1}, y_{1,1}, \ldots, y_{ny,1})$ in the above equation in order to obtain $(x_{0,3}, x_{1,3}, \ldots, x_{nx,3}, y_{0,3}, y_{1,3}, \ldots, y_{ny,3}) = (x_{0,1}", x_{1,1}", \ldots, x_{nx,1}", y_{0,1}", y_{1,1}", \ldots, y_{ny,1}") + (x_{0,2}, x_{1,2}, \ldots, x_{nx,2}, y_{0,2}, y_{1,2}, \ldots, y_{ny,2})$.

Mappings that are used to define equivalences can be based on certain properties that exist in elliptic polynomial equations, such as symmetry between variables. As an example, we consider the point $(x_0, x_1, y_0)$ that satisfies the equation $y_0^2 = x_0^3 + x_1^3 + x_0 x_1$. The equivalent of this point may be defined as $(x_1, x_0, -y_0)$.

With regard to the addition rules for $(EC^{nx+ny+2}, +)$, the addition of two points $(x_{0,1}, x_{1,1}, \ldots, x_{nx,1}, y_{0,1}, y_{1,1}, \ldots, y_{ny,1}) \in EC^{nx+ny+2}$ and $(x_{0,2}, x_{1,2}, \ldots, x_{nx,2}, y_{0,2}, y_{1,2}, \ldots, y_{ny,2}) \in EC^{nx+ny+2}$, or $(x_{0,3}, x_{1,3}, \ldots, x_{nx,3}, y_{0,3}, y_{1,3}, \ldots, y_{ny,3}) = (x_{0,1}, x_{1,1}, \ldots, x_{nx,1}, y_{0,1}, y_{1,1}, \ldots, y_{ny,1}) + (x_{0,2}, x_{1,2}, \ldots, x_{nx,2}, y_{0,2}, y_{1,2}, \ldots, y_{ny,2})$ is calculated in the following: First, a straight line is drawn which passes through the two points to be added. The straight line intersects $EC^{nx+ny+2}$ at a third point, which we denote $(x_{0,3}', x_{1,3}', \ldots, x_{nx,3}', y_{0,3}', y_{1,3}', \ldots, y_{ny,3}') \in EC^{xn+ny+2}$. The sum point is defined as $(x_{0,3}, x_{1,3}, \ldots, x_{nx,3}, y_{0,3}, y_{1,3}, \ldots, y_{ny,3}) = -(x_{0,3}', x_{1,3}', \ldots, x_{nx,3}', y_{0,3}', y_{1,3}', \ldots, y_{ny,3}')$.

From the above definition of the addition rule, addition over $EC^{nx+ny+2}$ is commutative, i.e., $(x_{0,1}, x_{1,1}, \ldots, x_{nx,1}, y_{0,1}, y_{1,1}, \ldots, y_{ny,1}) + (x_{0,2}, x_{1,2}, \ldots, x_{nx,2}, y_{0,2}, y_{1,2}, \ldots, y_{ny,2}) = (x_{0,2}, x_{1,2}, \ldots, x_{nx,2}, y_{0,2}, y_{1,2}, \ldots, y_{ny,2}) + (x_{0,1}, x_{1,1}, \ldots, x_{nx,1}, y_{0,1}, y_{1,1}, \ldots, y_{ny,1})$ for all $(x_{0,1}, x_{1,1}, \ldots, x_{nx,1}, y_{0,1}, y_{1,1}, \ldots, y_{ny,1}) \in EC^{nx+ny+2}$ and $(x_{0,2}, x_{1,2}, \ldots, x_{nx,2}, y_{0,2}, y_{1,2}, \ldots, y_{ny,2}) \in EC^{nx+ny+2}$. This commutivity satisfies axiom (iii) above.

There are two primary cases that need to be considered for the computation of point addition for (EC$^{xn+ny+2}$):

A. For at least one $j \in S_{nx}$, $x_{j,1} \neq x_{j,2}$; and

B. for all $j \in S_{nx}$, $x_{j,1} = x_{j,2} = x_{j,o}$

Case B includes three sub-cases:

i. for all $k \in S_{ny} y_{k,1} = y_{k,2}$, i.e., $(x_{0,1}, x_{1,1}, \ldots, x_{nx,1}, y_{0,1}, y_{1,1}, \ldots, y_{ny,1}) = (x_{0,2}, x_{1,2}, \ldots, x_{nx,2}, y_{0,2}, y_{1,2}, \ldots, y_{ny,2})$, which corresponds to point doubling;

ii. for $k \in S_{ny}$ & $k \neq 0$, $y_{k,1} = y_{k,2}$, and where $y_{0,1}$ & $y_{0,2}$ are the roots of the following quadratic equation in $y_0$:

$$a_{10} y_0^2 + \sum_{k \in S_{ny}, k \neq 0} a_{1k} y_{k,1}^2 + y_0 \left\{ \sum_{k \in S_{ny}, k \neq 0} a_{2k0} y_{k,1} + \sum_{l \in S_{ny}, l \neq 0} a_{20l} y_{l,1} \right\} +$$

$$\sum_{k,l \in S_{ny}, l \neq k, l \& k \neq 0} a_{2kl} y_{k,1} y_{l,1} + a_{30} y_0 + \sum_{k \in S_{ny}, k \neq 0} a_{3k} y_{k,1} +$$

$$y_0^2 \sum_{i \in S_{nx}} c_{100i} x_{i,1} + y_0 \left\{ \sum_{k \in S_{ny}, i \in S_{nx}} c_{1k0i} y_{k,1} x_{i,1} + \sum_{l \in S_{ny}, i \in S_{nx}} c_{10li} y_{l,1} x_{i,1} \right\} +$$

$$\sum_{k,l \in S_{ny}, l \& k \neq 0, i \in S_{nx}} c_{1kli} y_{k,1} y_{l,1} x_{i,1} +$$

$$y_0 \sum_{l \in S_{nx}} c_{20l} x_{l,1} + \sum_{k \in S_{ny}, k \neq 0, l \in S_{nx}} c_{2kl} y_{k,1} x_{l,1} +$$

$$y_0 \sum_{l,i \in S_{nx}} c_{30li} x_{i,1} x_{i,l} + \sum_{k \in S_{ny}, k \neq 0, l,i \in S_{nx}} c_{3kli} y_{k,1} x_{l,1} x_{i,1} =$$

$$\sum_{l \in S_{nx}} b_{1l} x_{l,1}^3 + \sum_{l,k \in S_{nx} l \neq k} b_{2lk} x_{l,1}^2 x_{k,1} + \sum_{l,k \in S_{nx}} b_{3lk} x_{l,1} x_{k,1} + \sum_{k \in S_{nx}} b_{4k} x_{k,1} + b_c,$$

which corresponds to point inverse; and iii. all other conditions except those in Cases B.i and B.ii. This case occurs only when ny is greater than or equal to one.

For Case A, for at least one $j \in S_{nx} x_{j,1} \neq x_{j,2}$, a straight line in (nx+ny+2)-dimensional space is defined by $$\frac{y_k - y_{k,1}}{y_{k,2} - y_{k,1}} = \frac{x_j - x_{j,1}}{x_{j,2} - x_{j,1}},$$

$k \in S_{ny}$ and $j \in S_{nx}$ and $$\frac{x_i - x_{i,1}}{x_{i,2} - x_{i,1}} = \frac{x_j - x_{j,1}}{x_{j,2} - x_{j,1}},$$

$i \neq j$, $i \in S_{nx}$.

For this case, $y_k = m_{yk} x_j + c_{yk}$, where $$m_{yk} = \frac{y_{k,2} - y_{k,1}}{x_{j,2} - x_{j,1}}$$

and $c_{yk} = y_{k,1} - x_{j,1} m_{yk}$. Further, $x_i = m_{xi} x_j + c_{xi}$, where $$m_{xi} = \frac{x_{i,2} - x_{i,1}}{x_{j,2} - x_{j,1}}$$

and $c_{xi} = x_{x,1} - x_{j,1} m_{xi}$. Equation (1) can then be re-written as $$\sum_{k \in S_{ny}} a_{1k} y_k^2 + \sum_{k,l \in S_{ny}, l \neq k} a_{2kl} y_k y_l + \sum_{k \in S_{ny}} a_{3k} y_k +$$

$$x_j \sum_{k,l \in S_{ny}} c_{1klj} y_k y_l + \sum_{k,l \in S_{ny}, i \in S_{nx}, i \neq j} c_{1kli} y_k y_l x_i + x_j \sum_{k \in S_{ny}} c_{2kj} y_k +$$

$$\sum_{k \in S_{ny}, l \in S_{nx}, l \neq j} c_{2kl} y_k x_l + x_j^2 \sum_{k \in S_{ny}} c_{3kjj} y_k + x_j \sum_{k \in S_{ny}, l \in S_{nx}, l \neq j} c_{3klj} y_k x_l +$$

$$x_j \sum_{k \in S_{ny}, i \in S_{nx}, i \neq j} c_{3kji} y_k x_i + \sum_{k \in S_{ny}, l, i \in S_{nx}, l \& i \neq j} c_{3kli} y_k x_l x_i =$$

$$b_{1j} x_j^3 + \sum_{l \in S_{nx}, l \neq j} b_{1l} x_l^3 + x_j^2 \sum_{k \in S_{nx}, k \neq j} b_{2jk} x_k + x_j \sum_{l \in S_{nx}, l \neq j} b_{2lj} x_l^2 +$$

$$\sum_{l,k \in S_{nx}, l \neq k \neq j, l \neq j} b_{2lk} x_l^2 x_k + b_{3jj} x_j^2 + x_j \sum_{k \in S_{nx}, k \neq j} b_{3jk} x_k +$$

$$x_j \sum_{l \in S_{nx}, l \neq j} b_{3lj} x_l + \sum_{l,k \in S_{nx}, l \neq k \neq j} b_{3lk} x_l x_k,$$

and substitution of $$+ b_{4j} x_j + \sum_{k \in S_{nx}, k \neq j} b_{4k} x_k + b_c$$

the above into the rewritten equation (1) for $y_k$, $k \in S_{ny}$ and $x_i$, $i \in S_{ny}$ & $i \neq j$, results in $$\sum_{k \in S_{ny}} a_{1k} (m_{yk} x_j + c_{yk})^2 + \sum_{k,l \in S_{ny}, l \neq k} a_{2kl} (m_{yk} x_j + c_{yk})(m_{yl} x_j + c_{yl}) +$$

$$\sum_{k \in S_{ny}} a_{3k} (m_{yk} x_j + c_{yk}) + x_j \sum_{k,l \in S_{ny}} c_{1klj} (m_{yk} x_j + c_{yk})(m_{yl} x_j + c_{yl}) +$$

$$\sum_{k,l \in S_{ny}, i \in S_{nx}, i \neq j} c_{1kli} (m_{yk} x_j + c_{yk})(m_{yl} x_j + c_{yl})(m_{xi} x_j + c_{xi}) +$$

$$x_j \sum_{k \in S_{ny}} c_{2kj} (m_{yk} x_j + c_{yk}) + \sum_{k \in S_{ny}, l \in S_{nx}, l \neq j} c_{2kl} (m_{yk} x_j + c_{yk})(m_{xl} x_j + c_{xl}) +$$

$$x_j^2 \sum_{k \in S_{ny}} c_{3kjj} (m_{yk} x_j + c_{yk}) +$$

$$x_j \sum_{k \in S_{ny}, l \in S_{nx}, l \neq j} c_{3klj} (m_{yk} x_j + c_{yk})(m_{xl} x_j + c_{xl}) +$$

$$x_j \sum_{k \in S_{ny}, i \in S_{nx}, i \neq j} c_{3klji} (m_{yk} x_j + c_{yk})(m_{xi} x_j + c_{xi}) +$$

$$\sum_{k \in S_{ny}, l, i \in S_{nx}, l \& i \neq j} c_{3kli} (m_{yk} x_j + c_{yk})(m_{xl} x_j + c_{xl})(m_{xi} x_j + c_{xi}) =$$

$$b_{1j} x_j^3 + \sum_{l \in S_{nx}, l \neq j} b_{1l} (m_{xl} x_j + c_l)^3 + x_j^2 \sum_{k \in S_{nx}, k \neq j} b_{2jk} (m_{xk} x_j + c_{xk}) +$$

$$x_j \sum_{l \in S_{nx}, l \neq j} b_{2lj} (m_{xl} x_j + c_{xl})^2 +$$

$$\sum_{l,k \in S_{nx}, l \& k \neq j, l \neq j} b_{2lk} (m_{xl} x_j + c_{xl})^2 (m_{xk} x_j + c_{xk}) + b_{3jj} x_j^2 +$$

$$x_j \sum_{k \in S_{nx}, k \neq j} b_{3jk} (m_{xk} x_j + c_{xk}) + x_j \sum_{l \in S_{nx}, l \neq j} b_{3lj} (m_{xl} x_j + c_{xl}) +$$

$$\sum_{l,k \in S_{nx}, l \& k \neq j} b_{3lk} (m_{xl} x_j + c_{xl})(m_{xk} x_j + c_{xk}) +$$

-continued $$b_{4j}x_j \sum_{k \in S_{nx}, k \neq j} a_{6k}(m_{xk}x_j + c_{xk}) + b_c.$$

Expanding the terms in the above equation leads to a cubic equation in $x_j$, $C_3 x_j^3 + C_2 x_j^2 + C_1 x_j + C_0 = 0$, where $C_3$, $C_2$, $C_1$ & $C_0$ are obtained from the above equation.

Assuming $C_3 \neq 0$, the above cubic equation in $x_j$ has three roots $x_{j,1}$, $x_{j,2}$, & $x'_{j,3}$ and can be written as $(x_j - x_{j,1})(x_j - x_{j,2})(x_j - x'_{j,3}) = 0$. Normalizing by the coefficient of $x^3$ and equating the coefficients of $x^2$ in the resulting equation with that in $(x_j - x_{j,1})(x_j - x_{j,2})(x_j - x'_{j,3}) = 0$, one obtains a solution for $x'_{j,3}$:

$$x'_{j,3} = \frac{-C_2}{C_3} - x_{j,1} - x_{j,2}. \tag{2}$$

The values of $y'_{k,3}$, $k \in S_{ny}$, and $x'_{i,3}$, $i \in S_{nx}$ & $i \neq j$, may be similarly obtained from equations for $x_j = x'_{j,3}$.

For cases where $C_3 = 0$, $C_3 x_j^3 + C_2 x_j^2 + C_1 x_j + C_0 = 0$ becomes a quadratic equation. Such quadratic equations may be used in the definition of point equivalences.

With regard to Case B for all $j \in S_{nx}$, $x_{j,1} = x_{j,2}$, the three sub-cases are considered below. In all cases, $x_{j,o}$ is defined as $x_{j,o} = x_{j,1} = x_{j,2}$, $j \in S_{nx}$.

For Case B.i., all $k \in S_{ny}$, $V_{k,1} = y_{k,2}$, which corresponds to point doubling. In this case, $(x_{0,1}, x_{1,1}, \ldots, x_{nx,1}, y_{0,1}, y_{1,1}, \ldots, y_{ny,1}) = (x_{0,2}, x_{1,2}, \ldots, x_{nx,2}, y_{0,2}, y_{1,2}, \ldots, y_{ny,2})$. Letting $(x_{0,o}, x_{1,o}, \ldots, x_{nx,o}, y_{0,o}, y_{1,o}, \ldots, y_{ny,o}) = (x_{0,1}, x_{1,1}, \ldots, x_{nx,1}, y_{0,1}, y_{1,1}, \ldots, y_{ny,1}) = (x_{0,2}, x_{1,2}, \ldots, x_{nx,2}, y_{0,2}, y_{1,2}, \ldots, y_{ny,2})$ the sum is written as $$(x_{0,3}, x_{1,3}, \ldots, x_{nx,3}, y_{0,3}, y_{1,3}, \ldots, y_{ny,3}) = (x_{0,o}, x_{1,o}, \ldots, x_{nx,o}, y_{0,o}, y_{1,o}, \ldots, y_{ny,o}) + (x_{0,o}, x_{1,o}, \ldots, x_{nx,o}, y_{0,o}, y_{1,o}, \ldots, y_{ny,o}). \tag{3}$$

There are several ways of defining the addition in this case. Three possible rules are described below: Case B.i.1: Letting $S_{nx,Lx}$ denote a subset of $S_{nx}$ with Lx elements; i.e., $S_{nx,Lx} \subseteq S_{nx}$; letting $S_{ny,Ly}$ denote a subset of $S_{ny}$ with Ly elements and which does not include the element 0; i.e. $S_{ny,Ly} \subseteq S_{ny}$ and $0 \notin S_{ny,Ly}$; setting the value of Lx and Ly as at least one, then the straight line in this case can be defined as a tangent to the point $(x_{0,o}, x_{1,o}, \ldots, x_{nx,o}, y_{0,o}, y_{1,o}, \ldots, y_{ny,o})$ defined in a sub-dimensional space with coordinates $y_n$ and $x_m$ with $n \in S_{ny,Ly}$ and $m \in S_{nx,Lx}$.

In this case, the gradients $m_{yn}$ and $m_{xm}$ of the straight line to be used in equation (2) are essentially the first derivatives of $y_n$ and $x_m$, $n \in S_{ny,Ly}$ and $m \in S_{nx,Lx}$, for F with respect to $x_j$, $j \in S_{nx,Lx}$; i.e., $$m_{yn} = \frac{dy_n}{dx_j} \text{ and } m_{xn} = \frac{dx_m}{dx_j}.$$

Using these derivatives for the values of the gradients, $$m_{yn} = \frac{dy_n}{dx_j},$$

where $n \in S_{ny,Ly}$, and $$m_{xn} = \frac{dx_m}{dx_j},$$

where $m \in S_{nx,Lx}$, in equation (2) and noting that it is assumed that $$\frac{dx_m}{dx_j} = 0, \text{ for } m \in (S_{nx} - S_{nx,Lx}) \text{ and}$$

$$\frac{dy_n}{dx_j} = 0, \text{ for } n \in (S_{ny} - S_{ny,Lx}),$$

then a solution for $x'_{j,3}$ may be obtained.

The values of $y'_{n,3}$ for $n \in S_{ny}$ and $x'_{m,3}$, for $m \in S_{nx \& m \neq j}$, can further be obtained for $x_j = x'_{j,3}$. The choice of the $x_m$-coordinates, $m \in S_{nx,Lx}$, and $y_n$-coordinates, $n \in S_{ny,Ly}$, which can be used to compute the tangent of the straight line in this case may be chosen at random or according to a pre-defined rule. Further, a different choice of the $x_m$-coordinates, $m \in S_{nx,Lx}$, and $y_n$-coordinates, $n \in S_{ny,Ly}$, may be made when one needs to compute successive point doublings, such as that needed in scalar multiplication.

With regard to the next case, Case B.i.2, the second possible way of defining the addition of a point with itself is to apply a sequence of the point doublings according to the rule defined above in Case B.i.1, where the rule is applied with a different selection of the x-coordinate(s) and y-coordinates(s) in each step of this sequence.

In the third sub-case, Case B.i.3, a point is substituted with one of its equivalents. Letting $(x_{0,oe}, x_{1,oe}, \ldots, x_{nx,oe}, y_{0,oe}, y_{1,oe}, \ldots, y_{ny,oe})$ represent the equivalent point of $(x_{0,o}, x_{1,o}, \ldots, x_{nx,o}, y_{0,o}, y_{1,o}, \ldots, y_{ny,o})$, then equation (3) may be written as $(x_{0,3}, x_{1,3}, \ldots, x_{nx,3}, y_{0,3}, y_{1,3}, \ldots, y_{ny,3}) = (x_{0,o}, x_{1,o}, \ldots, x_{nx,o}, y_{0,o}, y_{1,o}, \ldots, y_{ny,o}) + (x_{0,oe}, x_{1,oe}, \ldots, x_{nx,oe}, y_{0,oe}, y_{1,oe}, \ldots, y_{ny,oe})$.

With regard to Case B.ii, for $k \in S_{ny}$, $k \neq 0$, $y_{k,1} = y_{k,2}$, and where $y_{0,1}$ & $y_{0,2}$ are the roots of the quadratic equation in $y_0$, this case corresponds to generation of the point inverse.

Letting $y_{k,1} = y_{k,2} = y_{k,o}$ for $k \in S_{ny}$ & $k \neq 0$, then any two points $(x_{0,o}, x_{1,o}, \ldots, x_{nx,o}, y_{0,1}, y_{1,o}, \ldots, y_{ny,o}) \in EC^{nx+ny+2}$ and $(x_{0,o}, x_{1,o}, \ldots, x_{nx,o}, y_{0,2}, y_{1,o}, \ldots, y_{ny,o}) \in EC^{nx+ny+2}$ are in the hyper-plane with $x_i = x_{i,o}$, $i \in S_{nx}$ and $y_k = y_{k,o}$, $k \in S_{ny}$ & $k \neq 0$. Thus, any straight line joining these two points such that $(x_{0,o}, x_{1,o}, \ldots, x_{nx,o}, y_{0,1}, y_{1,o}, \ldots, y_{ny,o}) \neq (x_{0,o}, x_{1,o}, \ldots, x_{nx,o}, y_{0,2}, y_{1,o}, \ldots, y_{ny,o}) \in EC^{nx+ny+2}$ is also in this hyper-plane.

Substituting the values of $x_{0,o}, x_{1,o}, \ldots, x_{nx,o}, y_{1,o}, \ldots$, & $y_{ny,o}$ in an elliptic polynomial equation with multiple x-coordinates and multiple y-coordinates, a quadratic equation for $y_0$ is obtained, as given above. Thus, $y_0$ has only two solutions, $y_{0,1}$ & $y_{0,2}$.

Thus, a line joining the two points $(x_{0,o}, x_{1,o}, \ldots, x_{nx,o}, y_{0,1}, y_{1,o}, \ldots, y_{ny,o}) \in EC^{nx+ny+2}$ and $(x_{0,o}, x_{1,o}, \ldots, x_{nx,o}, y_{0,2}, y_{1,o}, \ldots, y_{ny,o}) \in EC^{nx+ny+2}$ does not intersect with $EC^{nx+ny+2}$ at a third point.

A line that joins these two points is assumed to intersect with $EC^{nx+ny+2}$ at infinity $(x_{0,I}, x_{1,I}, \ldots, x_{nx,I}, y_{0,I}, y_{1,I}, \ldots, y_{ny,I}) \in EC^{nx+ny+2}$. This point at infinity is used to define both the inverse of a point in $EC^{nx+ny+2}$ and the identity point. According to the addition rule defined above, one can write, $$(x_0, x_1, \ldots, x_{nx}, y_{0,1}, y_1, \ldots, y_{ny}) + (x_0, x_1, \ldots, x_{nx}, y_{0,2}, y_1, \ldots, y_{ny}) = (x_{0,I}, x_{1,I}, \ldots, x_{nx,I}, y_{0,I}, y_{1,I}, \ldots, y_{ny,I}) \tag{4}$$

since the third point of intersection of such lines is assumed to be at infinity, $(x_{0,I}, x_{1,I}, \ldots, x_{nx,I}, y_{0,I}, y_{1,I}, \ldots, y_{ny,I}) \in EC^{nx+ny+2}$. Thus, this equation defines a unique inverse for any point $(x_0, x_1, \ldots, x_{nx}, y_0, y_1, \ldots, y_{ny}) \in EC^{nx+ny+2}$, namely $-(x_0, x_1, \ldots, x_{nx}, y_{0,1}, y_1, \ldots, y_{ny}) = (x_0, x_1, \ldots, x_{nx}, y_{0,2}, y_1, \ldots, y_{ny})$.

Thus, equation (4) can be written as $$(x_0, x_1, \ldots, x_{nx}, y_{0,1}, y_1, \ldots, y_{ny}) - (x_0, x_1, \ldots, x_{nx}, y_{0,1}, y_1, \ldots, y_{ny}) = (x_{0,I}, x_{1,I}, \ldots, x_{nx,I}, y_{0,I}, y_{1,I}, \ldots, y_{ny,I}). \quad (5)$$

Further, a line joining the point at infinity $(x_{0,I}, x_{1,I}, \ldots, x_{nx,I}, y_{0,I}, y_{1,I}, \ldots, y_{ny,I}) \in EC^{nx+ny+2}$ and a point $(x_0, x_1, \ldots, x_{nx}, y_{0,1}, y_1, \ldots, y_{ny}) \in EC^{nx+ny+2}$ will intersect with $EC^{nx+ny+2}$ at $(x_0, x_1, \ldots, x_{nx}, y_{0,2}, y_1, \ldots, y_{ny}) \in EC^{nx+ny+2}$. Thus, from the addition rule defined above, $$(x_0, x_1, \ldots, x_{nx}, y_0, y_1, y_2, \ldots, y_{ny}) + (x_{0,I}, x_{1,I}, \ldots, x_{nx,I}, y_{0,I}, y_{1,I}, \ldots, y_{ny,I}) = (x_0, x_1, \ldots, x_{nx}, y_0, y_1, \ldots, y_{ny}). \quad (6)$$

Equation (5) satisfies axiom (ii) while equation (6) satisfies axiom (i), defined above.

Case B.iii applies for all other conditions except those in cases B.i and B.ii. This case occurs only when ny is greater than or equal to one. Given two points $(x_{0,o}, x_{1,o}, \ldots, x_{nx,o}, y_{0,1}, y_{1,1}, \ldots, y_{ny,1}) \in EC^{nx+ny+2}$ and $(x_{0,o}, x_{1,o}, \ldots, x_{nx,o}, y_{0,2}, y_{1,2}, \ldots, y_{ny,2}) \in EC^{nx+ny+2}$ which do not satisfy the conditions of cases B.i and B.ii above, the sum point is written as $(x_{0,3}, x_{1,3}, \ldots, x_{nx,3}, y_{0,3}, y_{1,3}, \ldots, y_{ny,3}) = (x_{0,o}, x_{1,o}, \ldots, x_{nx,o}, y_{0,1}, y_{1,1}, \ldots, y_{ny,1}) + (x_{0,o}, x_{1,o}, \ldots, x_{nx,o}, y_{0,2}, y_{1,2}, \ldots, y_{ny,2})$.

There are several possible rules to find the sum point in this case. Three possible methods are given below:

1) Using three point doublings and one point addition, $(x_{0,3}, x_{1,3}, \ldots, x_{nx,3}, y_{0,3}, y_{1,3}, \ldots, y_{ny,3}) = 4(x_{0,o}, x_{1,o}, \ldots, x_{nx,o}, y_{0,1}, y_{1,1}, \ldots, y_{ny,1}) - 2(x_{0,o}, x_{1,o}, \ldots, x_{nx,o}, y_{0,2}, y_{1,2}, \ldots, y_{ny,2})$;

2) using one point doublings and three point additions, $(x_{0,3}, x_{1,3}, \ldots, x_{nx,3}, y_{0,3}, y_{1,3}, \ldots, y_{ny,3}) = (2(x_{0,o}, x_{1,o}, \ldots, x_{nx,o}, y_{0,1}, y_{1,1}, \ldots, y_{ny,1}) + (x_{0,o}, x_{1,o}, \ldots, x_{nx,o}, y_{0,2}, y_{1,2}, \ldots, y_{ny,2})$; and 3) using point equivalence, $(x_{0,3}, x_{1,3}, \ldots, x_{nx,3}, y_{0,3}, y_{1,3}, \ldots, y_{ny,3}) = (x_{0,o}, x_{1,o}, \ldots, x_{nx,o}, y_{0,1}, y_{1,1}, \ldots, y_{ny,1}) + (x_{0,oe}, x_{1,oe}, \ldots, x_{nx,oe}, y_{0,2e}, y_{1,2e}, \ldots, y_{ny,2e})$, where $(x_{0,oe}, x_{1,oe}, \ldots, x_{nx,oe}, y_{0,2e}, y_{1,2e}, \ldots, y_{ny,3e})$ is assumed to be the equivalent point of $(x_{0,o}, x_{1,o}, \ldots, x_{nx,o}, y_{0,2}, y_{1,2}, \ldots, y_{ny,2})$.

It should be noted that the above methods for defining the sum point are not the only ones that can be defined and are provided for exemplary purposes only. The choice of method used to obtain the sum point in this case should depend on the computation complexity of point addition and point doubling.

With regard to associativity, one way of proving associativity of $(EC^{nx+ny+2}, +)$ is as follows: Given particular elliptic polynomial equations (i.e., for particular coefficients $a_{1l}, a_{2kl}, a_{3k}, c_{1lki}, c_{2kl}, c_{3kli}, b_{1l}, b_{2lk}, b_{3lk}, b_{4k}, b_c \in F$) defined over a finite field F, if it can be shown by computation that any point $Q \in EC^{nx+ny+2}$ (and any of its equivalent points) can be uniquely written as $k_Q P \in EC^{nx+ny+2}$, where P is the generator point of $(EC^{nx+ny+2}, +)$, then the corresponding $EC^{nx+ny+2}$ groups based on such polynomials are associative. This is because any three points Q, R, $S \in EC^{nx+ny+2}$ (or any of their equivalent points) can be written as $k_Q P, k_R P, k_S P \in EC^{nx+ny+2}$, respectively, thus their sum $(Q+R+S) = (k_Q P + k_R P + k_S P) = (k_Q + k_R + k_S) P$ can be carried out in any order.

The following elliptic polynomial equation with nx=1 and ny=0 is used to show an example of the equations in Case A used in point addition: $y_0^2 = x_0^3 + x_1^3 + x_0 x_1$. Choosing $x_j = x_0$, and substituting $y_k = m_{yk} x_j + c_{yk}$ from Case A above for $y_0$, and the corresponding equation $x_i = m_{xi} x_j + c_{xi}$ for $X_1$, one obtains $(m_{y0} X_0 + c_{y0})^2 = X_0^3 + (m_{x1} x_0 + c_{x1})^3 + x_0 (m_{x1} x_0 + c_{x1})$.

Expanding this equation yields $m_{y0}^2 x_0^2 + 2 m_{y0} x_0 + c_{y0}^2 = x_0^3 + m_{x1}^3 x_0^3 + 3 m_{x1}^2 c_{x1} x_0^2 + 3 m_{x1} x_{x1}^2 x_0 + c_{x1}^3 + m_{x1} x_0^2 + c_{x1} x_0$, or $(1 + m_{x1}^3) x_0^3 + (3 m_{x1}^2 c_{x1} + m_{x1} - m_{y0}^2) x_0^2 + (3 m_{x1} c_{x1}^2 + c_{x1} - 2 m_{y0} c_{y0}) x_0 + c_{x1}^3 - c_{y0}^2 = 0$. From equation (2), the solution for $x_{0,3}$ in this case is obtained:

$$x'_{0,3} = \frac{-(3 m_{x1}^2 c_{x1} + m_{x1} - m_{y0}^2)}{(1 + m_{x1}^3)} - x_{j,1} - x_{j,2}.$$

Similarly, one can obtain the values of $Y_{0,3}'$ and $x_{1,3}'$ for $x_0 = x_{0,3}'$.

It should be noted that when $m_{x1} = -1$, the coefficient of the cubic term in the above is zero; i.e. $C_3 = 0$. In this case, the resulting quadratic equation can be used in the definition of point equivalences for the points that satisfy the elliptic polynomial equation.

Each of the equations for point addition and point doublings derived for cases A and B above require modular inversion or division. In cases where field inversions or divisions are significantly more expensive (in terms of computational time and energy) than multiplication, projective coordinates are used to remove the requirement for field inversion or division from these equations.

Several projective coordinates can be utilized. In the preferred embodiment, the Jacobean projective coordinate system is used. As an example, we examine:

$$x_i = \frac{X_i}{V^2} \quad \text{for } i \in S_{nx}; \text{ and} \quad (7)$$

$$y_k = \frac{Y_k}{V^3} \quad \text{for } k \in S_{ny}. \quad (8)$$

Using the Jacobian projection given above yields:

$$\sum_{k \in S_{ny}} a_{1k} \frac{Y_k^2}{V^6} + \sum_{k,l \in S_{ny}, l \neq k} a_{2kl} \frac{Y_k}{V^3} \frac{Y_l}{V^3} + \sum_{k \in S_{ny}} a_{3k} \frac{Y_k}{V^3} + \quad (9)$$

$$\sum_{k,l \in S_{ny}, i \in S_{nx}} c_{1kli} \frac{Y_k}{V^3} \frac{Y_l}{V^3} \frac{X_i}{V^2} + \sum_{k \in S_{ny}, l \in S_{nx}} c_{2kl} \frac{Y_k}{V^3} \frac{X_l}{V^2} +$$

$$\sum_{k \in S_{ny}, l, i \in S_{nx}} c_{3kli} \frac{Y_k}{V^3} \frac{X_l}{V^2} \frac{X_i}{V^2} = \sum_{l \in S_{nx}} b_{1l} \frac{X_l^3}{V^6} +$$

$$\sum_{l,k \in S_{nx}, l \neq k} b_{2lk} \frac{X_l^2}{V^4} \frac{X_k}{V^2} + \sum_{l,k \in S_{nx}} b_{3lk} \frac{X_l}{V^2} \frac{X_k}{V^2} + \sum_{k \in S_{nx}} b_{4k} \frac{X_k}{V^2} + b_c$$

which can be rewritten as:

$$\sum_{k \in S_{ny}} a_{1k} Y_k^2 V^2 + \sum_{k,l \in S_{ny}, l \neq k} a_{2kl} Y_k Y_l V^2 + \quad (10)$$

$$\sum_{k \in S_{ny}} a_{3k} Y_k V^5 + \sum_{k,l \in S_{ny}, i \in S_{nx}} c_{1kli} Y_k Y_l X_i +$$

$$\sum_{k \in S_{ny}, l \in S_{nx}} c_{2kl} Y_k X_l V^3 + \sum_{k \in S_{ny}, l, i \in S_{nx}} c_{3kli} Y_k X_l X_i V =$$

-continued
$$\sum_{l \in S_{nx}} b_{1l} X_l^3 V^2 + \sum_{l,k \in S_{nx}, l \neq k} b_{2lk} X_l^2 X_k V^2 +$$
$$\sum_{l,k \in S_{nx}} b_{3lk} X_l X_k V^4 + \sum_{k \in S_{nx}} b_{4k} X_k V^6 + b_c V^8. \quad (5)$$

In the following, the points $(X_0, X_1, \ldots, X_{nx}, Y_0, Y_1, \ldots, Y_{ny}, V)$ are assumed to satisfy equation (10). When $V \neq 0$, the projected point $(X_0, X_1, \ldots, X_{nx}, Y_0, Y_1, \ldots, Y_{ny}, V)$ corresponds to the point $$(x_0, x_1, \ldots, x_{nx}, y_0, y_1, \ldots, y_{ny}) = \left( \frac{X_0}{V^2}, \frac{X_1}{V^2}, \ldots, \frac{X_{nx}}{V^2}, \frac{Y_0}{V^3}, \frac{Y_1}{V^3}, \ldots, \frac{Y_{ny}}{V^3} \right),$$

which satisfies equation (1).

Using Jacobean projective coordinate, equation (10) can be written as, $$\left( \frac{X_{0,3}}{V_3^2}, \frac{X_{1,3}}{V_3^2}, \ldots, \frac{X_{nx,3}}{V_3^2}, \frac{Y_{0,3}}{V_3^3}, \frac{Y_{1,3}}{V_3^3}, \ldots, \frac{Y_{ny,3}}{V_3^3} \right) = \quad (11)$$
$$\left( \frac{X_{0,1}}{V_1^2}, \frac{X_{1,1}}{V_1^2}, \ldots, \frac{X_{nx,1}}{V_1^2}, \frac{Y_{0,1}}{V_1^3}, \frac{Y_{1,1}}{V_1^3}, \ldots, \frac{Y_{ny,1}}{V_1^3} \right) +$$
$$\left( \frac{X_{0,2}}{V_2^2}, \frac{X_{1,2}}{V_2^2}, \ldots, \frac{X_{nx,2}}{V_2^2}, \frac{Y_{0,2}}{V_2^3}, \frac{Y_{1,2}}{V_2^3}, \ldots, \frac{Y_{ny,2}}{V_2^3} \right).$$

By using the Jacobian projective coordinate in the equations of Cases A and B above, and by an appropriate choice of the value of $V_3$, it can be shown that point doubling and point addition can be computed without the need for field inversion or division.

As noted above, the methods include data embedding. In order to embed a message bit string into a point $(x, \sqrt{\alpha}y)$ which satisfies either an elliptic polynomial equation $y^2 = x^3 + ax + b$ or its twist, $\overline{\alpha}y^2 = x^3 + ax + b$, the message bit string is first divided into N-bit strings and the $i^{th}$ block is denoted as $m_i$. Following this, the value of the bit string of $m_i$ is assigned to $x_{m_i}$, and the values of $x_{m_i}$ are substituted and the value of $t_{m_i}$ is computed using $t_{m_i} = c_{m_i}^3 + ax_{m_i} + b$.

If $t_{m_i}$ is quadratic residue, then $y_{m_i} = \sqrt{t_{m_i}}$ and the point is given as $(x_{m_i}, y_{m_i})$. However, if $t_{m_i}$ is non-quadratic residue, then $$y_{m_i} = \sqrt{\frac{t_{m_i}}{\alpha}}$$

and the point is given as $(x_{m_i}, \sqrt{\overline{\alpha}} y_{m_i})$. The message point is then denoted as $(x_{m_i}, \sqrt{\alpha_{m_i}} y_{m_i})$, where the point is on the elliptic polynomial if $\alpha_{m_i} = 1$, and the point is on the twist if $\alpha_{m_i} = \overline{\alpha}$.

The Legendre Symbol is used to test whether an element of $F(p)$ has a square root or not; i.e., whether an element is quadratic residue or not. The Legendre Symbol and test are as follows: given an element of a finite field $F(p)$, such as d, the Legendre symbol is defined as (d/p). In order to test whether d is quadratic residue or not, the Legendre symbol, (d/p), such that:

$$\left( \frac{d}{p} \right) = \begin{cases} +1 & \text{if } x \text{ is quadratic residue} \\ 0 & \text{if } x \equiv 0 \bmod F(p) \\ -1 & \text{otherwise.} \end{cases}$$

In the following embodiment, it is assumed that the maximum block size that can be embedded into the (nx+1) x-coordinates and the ny y-coordinates is (nx+ny+1)N bits, and that the compressed media data bit string length is a multiple of (nx+ny+1)N, for example, (u+1) (nx+ny+1)N. In other words, the number of (nx+ny+1)N-bit blocks in a message bit string is (u+1).

In order to generate the elliptic polynomial hash functions, the hash function parameters are first set up using the following method:

1) Specifying the values of nx and ny, and the set of coefficients $a_{1k}, a_{2kl}, a_{3k}, c_{1lki}, c_{2kl}, c_{3kli}, b_{1l}, b_{2lk}, b_{3lk}, b_{4k}, b_c \in F$, along with a base point on an elliptic polynomial $(x_{0,B}, x_{1,B}, \ldots, x_{nx,B}, y_{0,B}, y_{1,B}, \ldots, y_{ny,B}) \in EC^{nx+ny+2}$ and base point on the twist $(x_{0,TB}, x_{1,TB}, \ldots, x_{nx,TB}, \sqrt{\overline{\alpha}} y_{0,B}, y_{1,TB}, \ldots, y_{ny,TB}) \in TEC^{nx+ny+2}$, where all of these coefficients and points are made public;

2) selecting two random numbers $k_1, k_2$ that are kept secret for the specific hash function to be used;

3) computing the multiplication of the scalar $k_1$ with the point $(x_{0,B}, x_{1,B}, \ldots, x_{nx,B}, y_{0,B}, y_{1,B}, \ldots, y_{ny,B})$ to obtain the scalar multiplication, $(x_{0,Pu}, x_{1,Pu}, \ldots, x_{nx,Pu}, y_{0,Pu}, y_{1,Pu}, \ldots, y_{ny,Pu}) = k_1(x_{0,B}, x_{1,B}, \ldots, x_{nx,B}, y_{0,B}, y_{1,B}, \ldots, y_{ny,B})$, and the multiplication of the scalar $k_2$ with the point $(x_{0,TB}, x_{1,TB}, \ldots, x_{nx,TB}, \sqrt{\overline{\alpha}} y_{0,B}, y_{1,TB}, \ldots, y_{ny,TB})$ to obtain the scalar multiplication, $(x_{0,TPu}, x_{1,TPu}, \ldots, x_{nx,TPu}, \sqrt{\overline{\alpha}} y_{0,TPu}, y_{1,TPu}, \ldots, y_{ny,TPu}) = k_1(x_{0,TB}, x_{1,TB}, \ldots, x_{nx,TB}, \sqrt{\overline{\alpha}} y_{0,B}, y_{1,TB}, \ldots, y_{ny,TB})$;

4) making the two scalar multiplication points $(x_{0,Pu}, x_{1,Pu}, \ldots, x_{nx,Pu}, y_{0,Pu}, y_{1,Pu}, \ldots, y_{ny,Pu})$ and $(x_{0,TPu}, x_{1,TPu}, \ldots, x_{nx,TPu}, \sqrt{\overline{\alpha}} y_{0,TPu}, y_{1,TPu}, \ldots, y_{ny,TPu})$ public.

Next, the hash bit string of the message bits string is generated using the following method:

1) Pre-processing the message bit string to obtain a bit string that is a multiple of (nx+ny+1)N-bits;

2) computing the initial hash point $(x_{0,c_1}, x_{1,c_1}, \ldots, x_{nx,c_1}, y_{0,c_1}, y_{1,c_1}, \ldots, y_{ny,c_1})$ on the elliptic polynomial by multiplying the scalar integer value $k_{m_0}$ of the (nx+ny+1)N-bit string of the initial block of the message with the point $(x_{0,Pu}, x_{1,Pu}, \ldots, x_{nx,Pu}, y_{0,Pu}, y_{1,Pu}, \ldots, y_{ny,Pu})$ such that $(x_{0,c_1}, x_{1,c_1}, \ldots, x_{nx,c_1}, y_{0,c_1}, y_{1,c_1}, \ldots, y_{ny,c_1}) = k_{m_0}(x_{0,Pu}, x_{1,Pu}, \ldots, x_{nx,Pu}, y_{0,Pu}, y_{1,Pu}, \ldots, y_{ny,Pu})$;

(3) computing the initial hash point $(x_{0,Tc_1}, x_{1,Tc_1}, \ldots, x_{nx,Tc_1}, \sqrt{\overline{\alpha}} y_{0,Tc_1}, y_{1,Tc_1}, \ldots, y_{ny,Tc_1})$ on the twist of the elliptic polynomial by multiplying the scalar integer value $k_{m_1}$ of the (nx+ny+1)N-bit string of the next block of the message with a point $(x_{0,TPu}, x_{1,TPu}, \ldots, x_{nx,TPu}, \sqrt{\overline{\alpha}} y_{0,TPu}, y_{1,TPu}, \ldots, y_{ny,TPu})$ such that: $(x_{0,Tc_1}, x_{1,Tc_1}, \ldots, x_{nx,Tc_1}, \sqrt{\overline{\alpha}} y_{0,Tc_1}, y_{1,Tc_1}, \ldots, y_{ny,Tc_1}) = k_{m_1}(x_{0,TPu}, x_{1,TPu}, \ldots, x_{nx,TPu}, \sqrt{\overline{\alpha}} y_{0,TPu}, y_{1,TPu}, \ldots, y_{ny,TPu})$;

Then, starting with i=2, repeating steps 4 and 5 until i>u:

4) embedding the message (nx+ny+1)N-bit string of the $i^{th}$ block into the (nx+1) x-coordinates $X_0, x_1, \ldots, x_{nx}$ and the ny y-coordinates $y_1, \ldots, y_{ny}$ of the elliptic message point $(x_{0,m_i}, x_{1,m_i}, \ldots, x_{nx,m_i}, \sqrt{\alpha_{m_i}} y_{0,m_i}, y_{1,m_i}, \ldots, y_{ny,m_i})$ using the non-iterative embedding method described below;

5) if the message point of the $i^{th}$ block is on the elliptic polynomial (i.e., $\alpha_{m_i} = 1$), then the hash points are computed using $(x_{0,c_i}, x_{1,c_i}, \ldots, x_{nx,c_i}, y_{0,c_i}, y_{1,c_i}, \ldots, y_{ny,c_i}) = (x_{0,m_i}, x_{1,m_i}, \ldots, x_{nx,m_i}, y_{0,m_i}, y_{1,m_i}, \ldots, y_{ny,m_i}) + (x_{0,c_{i-1}}, x_{1,c_{i-1}}, \ldots$ $x_{nx,c_{i-1}}, y_{0,c_{i-1}}, y_{1,c_i}, \ldots, x_{ny,c_{i-1}})$ and $(x_{0,Tc_i}, x_{1,Tc_i}, \ldots, x_{nx,Tc_i}, \sqrt{\alpha} y_{0,Tc_i}, y_{1,Tc_i}, \ldots, y_{ny,Tc_i}) = (x_{0,Tc_{i-1}}, x_{1,Tc_{i-1}}, \ldots, x_{nx,Tc_{i-1}}, \sqrt{\alpha} y_{0,Tc_{i-1}}, y_{1,Tc_{i-1}}, \ldots, y_{ny,Tc_{i-1}})$, otherwise, they are computed using $(x_{0,Tc_i}, x_{1,Tc_i}, \ldots, x_{nx,Tc_i}, \sqrt{\alpha} y_{0,Tc_i}, y_{1,Tc_i}, \ldots, y_{ny,Tc_i}) = (x_{0,m_i}, x_{1,m_i}, \ldots, x_{nx,m_i}, \sqrt{\alpha} y_{0,m_i}, y_{1,m_i}, \ldots, y_{ny,m_i}) + (x_{0,Tc_{i-1}}, x_{1,Tc_{i-1}}, \ldots, x_{nx,Tc_{i-1}}, \sqrt{\alpha} y_{0,Tc_{i-1}}, y_{1,Tc_{i-1}}, \ldots, y_{ny,Tc_{i-1}})$ and $(x_{0,c_i}, x_{1,c_i}, \ldots, x_{nx,c_i}, y_{0,c_i}, y_{1,c_i}, \ldots, y_{ny,c_i}) = (x_{0,c_{i-1}}, x_{1,c_{i-1}}, \ldots, x_{nx,c_{i-1}}, y_{0,c_{i-1}}, y_{1,c_{i-1}}, \ldots, y_{ny,c_{i-1}})$; and 6) the appropriate bits of the x-coordinates, $x_{0,c}, x_{1,c}, \ldots, x_{nx,c}$, y-coordinates $y_{1,c}, \ldots, y_{ny,c}$ and the sign bit of $y_{0,c}$ of the hash point $(x_{0,c_u}, x_{1,c_u}, \ldots, x_{nx,c_u}, y_{0,c_u}, y_{1,c_u}, \ldots, y_{ny,c_u})$, and the appropriate bits of the x-coordinates, $x_{0,Tc}, x_{1,Tc}, \ldots, x_{nx,Tc}$, y-coordinates $y_{1,Tc}, \ldots, y_{ny,Tc}$ and the sign bit of $y_{0,Tc}$ of the hash point $(x_{0,Tc_u}, x_{1,Tc_u}, \ldots, x_{nx,Tc_u}, \sqrt{\alpha} y_{0,Tc_u}, y_{1,Tc_u}, \ldots, y_{ny,Tc_u})$ are concatenated together to form the hash bit string.

Alternatively, the elliptic polynomial hash functions may be set up as follows. First, the hash function parameters are set up using:

1) Specifying the values of nx and ny, and the set of coefficients $a_{1k}, a_{2kl}, a_{3k}, c_{1lki}, c_{2kl}, c_{3kli}, b_{1l}, b_{2lk}, b_{3lk}, b_{4k}, b_c \in F$, along with a base point on an elliptic polynomial $(x_{0,B}, x_{1,B}, \ldots, x_{nx,B}, y_{0,B}, y_{1,B}, \ldots, y_{ny,B}) \in EC^{xn+ny+2}$ and base point on its twist $(x_{0,TB}, x_{1,TB}, \ldots, x_{nx,TB}, \sqrt{\alpha} y_{0,B}, y_{1,TB}, \ldots, y_{ny,TB}) \in TEC^{xn+ny+2}$, where all of these coefficients and points are made public;

2) selecting two random numbers $k_1, k_2$ that are kept secret for the specific hash function to be used;

3) computing the multiplication of the scalar $k_1$ with the point $(x_{0,B}, x_{1,B}, \ldots, x_{nx,B}, y_{0,B}, y_{1,B}, \ldots, y_{ny,B})$ to obtain the scalar multiplication, $(x_{0,Pu}, x_{1,Pu}, \ldots, x_{nx,Pu}, y_{0,Pu}, y_{1,Pu}, \ldots, y_{ny,Pu}) = k_1(x_{0,B}, x_{1,B}, \ldots, x_{nx,B}, y_{0,B}, y_{1,B}, \ldots, y_{ny,B})$, and the multiplication of the scalar $k_2$ with the point $(x_{0,TB}, x_{1,TB}, \ldots, x_{nx,TB}, \sqrt{\alpha} y_{0,B}, y_{1,TB}, \ldots, y_{ny,TB})$ to obtain the scalar multiplication, $(x_{0,TPu}, x_{1,TPu}, \ldots, x_{nx,TPu}, \sqrt{\alpha} y_{0,TPu}, y_{1,TPu}, \ldots, y_{ny,TPu}) = k_1(x_{0,TB}, x_{1,TB}, \ldots, x_{nx,TB}, \sqrt{\alpha} y_{0,B}, y_{1,TB}, \ldots, y_{ny,TB})$;

4) making the two scalar multiplication points $(x_{0,Pu}, x_{1,Pu}, \ldots, x_{nx,Pu}, y_{0,Pu}, y_{1,Pu}, \ldots, y_{ny,Pu})$ and $(x_{0,TPu}, x_{1,TPu}, \ldots, x_{nx,TPu}, \sqrt{\alpha} y_{0,TPu}, y_{1,TPu}, \ldots, y_{ny,TPu})$ public.

Next, the hash bit string of the message bits string is generated using the following method:

1) Pre-processing the message bit string to obtain a bit string that is a multiple of (nx+ny+1)N-bits;

2) computing the point $(x_{0,S_1}, x_{1,S_1}, \ldots, x_{nx,S_1}, y_{0,S_1}, y_{1,S_1}, \ldots, x_{ny,S_1})$ on the elliptic polynomial by multiplying the scalar integer value $k_{m_0}$ of the N-bit string of the initial block of the message with the point $(x_{0,Pu}, x_{1,Pu}, \ldots, x_{nx,Pu}, y_{0,Pu}, y_{1,Pu}, \ldots, y_{ny,Pu})$ such that: $(x_{0,S_1}, x_{1,S_1}, \ldots, x_{nx,S_1}, y_{0,S_1}, y_{1,S_1}, \ldots, y_{ny,S_1}) = k_{m_0}(x_{0,Pu}, x_{1,Pu}, \ldots, x_{nx,Pu}, y_{0,Pu}, y_{1,Pu}, \ldots, y_{ny,Pu})$;

(3) computing the point $(x_{0,TS_1}, x_{1,TS_1}, \ldots, x_{nx,TS_1}, \sqrt{\alpha} y_{0,TS_1}, y_{1,TS_1}, \ldots, y_{ny,TS_1})$ on the twist of the elliptic polynomial by multiplying the scalar integer value $k_{m_1}$ of the N-bit string of the next block of the message with a point $(x_{0,TPu}, x_{1,TPu}, \ldots, x_{nx,TPu}, \sqrt{\alpha} y_{0,TPu}, y_{1,TPu}, \ldots, y_{ny,TPu})$, such that: $(x_{0,TS_1}, x_{1,TS_1}, \ldots, x_{nx,TS_1}, \sqrt{\alpha} y_{0,TS_1}, y_{1,TS_1}, \ldots, y_{ny,TS_1}) = k_{m_1}(x_{0,TPu}, x_{1,TPu}, \ldots, x_{nx,TPu}, \sqrt{\alpha} y_{0,TPu}, y_{1,TPu}, \ldots, y_{ny,TPu})$;

4) initializing the hash points as follows: $(x_{0,c_1}, x_{1,c_1}, \ldots, x_{nx,c_1}, y_{0,c_1}, y_{1,c_1}, \ldots, y_{ny,c_1}) = +(x_{0,S_1}, x_{1,S_1}, \ldots, x_{nx,S_1}, y_{0,S_1}, y_{1,S_1}, \ldots, x_{ny,S_1})$, and $(x_{0,Tc_1}, x_{1,Tc_1}, \ldots, x_{nx,Tc_1}, \sqrt{\alpha} y_{0,Tc_1}, y_{1,Tc_1}, \ldots, y_{ny,Tc_1}) = x_{0,TS_1}, x_{1,TS_1}, \ldots, x_{nx,TS_1}, \sqrt{\alpha} y_{0,TS_1}, y_{1,TS_1}, \ldots, x_{ny,TS_1})$; Then, starting with i=1, repeating steps 5 and 7 until i>u:

5) embedding the message (nx+ny+1)N-bit string of the $i^{th}$ block into the (nx+1) x-coordinates $X_0, x_1, \ldots, x_{nx}$ and the ny y-coordinates $y_1, \ldots, y_{ny}$ of the elliptic message point $(x_{0,m_i}, x_{1,m_i}, \ldots, x_{nx,m_i}, \sqrt{\alpha_{m_i}} y_{0,m_i}, y_{1,m_i}, \ldots, y_{ny,m_i})$ using the non-iterative embedding method described below;

6) doubling the points $(x_{0,S_i}, x_{1,S_i}, \ldots, x_{nx,S_i}, y_{0,S_i}, y_{1,S_i}, \ldots, x_{ny,S_i})$ and $(x_{0,TS_i}, x_{1,TS_i}, \ldots, x_{nx,TS_i}, \sqrt{\alpha} y_{0,TS_i}, y_{1,TS_i}, \ldots, x_{ny,TS_i})$, such that: $(x_{0,S_i}, x_{1,S_i}, \ldots, x_{nx,S_i}, y_{0,S_i}, y_{1,S_i}, \ldots, x_{ny,S_i}) = 2(x_{0,S_{i-1}}, x_{1,S_{i-1}}, \ldots, x_{nx,S_{i-1}}, y_{0,S_{i-1}}, y_{1,T_{i-1}}, \ldots, y_{ny,T_{i-1}})$ and $(x_{0,TS_i}, x_{1,TS_i}, \ldots, x_{nx,TS_i}, \sqrt{\alpha} y_{0,TS_i}, y_{1,TS_i}, \ldots, x_{ny,TS_i}) = 2(x_{0,TS_{i-1}}, x_{1,TS_{i-1}}, \ldots, x_{nx,TS_{i-1}}, \sqrt{\alpha} y_{0,TS_{i-1}}, y_{1,TS_{i-1}}, \ldots, x_{ny,TS_{i-1}})$;

7) if the message point of the $i^{th}$ block is on the elliptic polynomial (i.e., $\alpha_{m_i} = 1$), then the hash points are computed using: $(x_{0,c_i}, x_{1,c_i}, \ldots, x_{nx,c_i}, y_{0,c_i}, y_{1,c_i}, \ldots, y_{ny,c_i}) = (x_{0,m_i}, x_{1,m_i}, \ldots, x_{nx,m_i}, y_{0,m_i}, y_{1,m_i}, \ldots, y_{ny,m_i}) + (x_{0,S_i}, x_{1,S_i}, \ldots, x_{nx,S_i}, y_{0,S_i}, y_{1,S_i}, \ldots, x_{ny,S_i}) + (x_{0,m_{i-1}}, x_{1,m_{i-1}}, \ldots, x_{nx,m_{i-1}}, y_{0,m_{i-1}}, y_{1,m_i}, \ldots, x_{ny,m_{i-1}})$ and $(x_{0,Tc_i}, x_{1,Tc_i}, \ldots, x_{nx,Tc_i}, \sqrt{\alpha} y_{0,Tc_i}, y_{1,Tc_i}, \ldots, y_{ny,Tc_i}) = (x_{0,Tc_{i-1}}, x_{1,Tc_{i-1}}, \ldots, x_{nx,Tc_{i-1}}, \sqrt{\alpha} y_{0,Tc_{i-1}}, y_{1,Tc-1_i}, \ldots, x_{ny,Tc_{i-1}})$, otherwise, they are computed using: $(x_{0,Tc_i}, x_{1,Tc_i}, \ldots, x_{nx,Tc_i}, \sqrt{\alpha} y_{0,Tc_i}, y_{1,Tc_i}, \ldots, y_{ny,Tc_i}) = (x_{0,m_i}, x_{1,m_i}, \ldots, x_{nx,m_i}, \sqrt{\alpha} y_{0,m_i}, y_{1,m_i}, \ldots, y_{ny,m_i}) + (x_{0,TS_i}, x_{1,TS_i}, \ldots, x_{nx,TS_i}, \sqrt{\alpha} y_{0,TS_i}, y_{1,TS_i}, \ldots, y_{ny,TS_i}) + (x_{0,m_{i-1}}, x_{1,m_{i-1}}, \ldots, x_{nx,m_{i-1}}, \sqrt{\alpha} y_{0,m_{i-1}}, y_{1,m_{i-1}}, \ldots, x_{ny,m_{i-1}})$ and $(x_{0,c_i}, x_{1,c_i}, \ldots, x_{nx,c_i}, y_{0,c_i}, y_{1,c_i}, \ldots, y_{ny,c_i}) = (x_{0,c_{i-1}}, x_{1,c_{i-1}}, \ldots, x_{nx,c_{i-1}}, y_{0,c_{i-1}}, y_{1,c_i}, \ldots, x_{ny,c_{i-1}})$;

8) the appropriate bits of the x-coordinates $x_{0,c}, x_{1,c}, \ldots, x_{nx,c}$, y-coordinates $y_{1,c}, \ldots, y_{ny,c}$ and the sign bit of $y_{0,c}$ the hash point $(x_{0,c_u}, x_{1,c_u}, \ldots, x_{nx,c_u}, y_{0,c_u}, y_{1,c_u}, \ldots, y_{ny,c_u})$, and the appropriate bits of the x-coordinates, $x_{0,Tc}, x_{1,Tc}, \ldots, x_{nx,Tc}$, y-coordinates $y_{1,Tc}, \ldots, y_{ny,Tc}$ and the sign bit of $y_{0,Tc}$ of the hash point $(x_{0,Tc_u}, x_{1,Tc_u}, \ldots, x_{nx,Tc_u}, \sqrt{\alpha} y_{0,Tc_u}, y_{1,Tc_u}, \ldots, y_{ny,Tc_u})$ are concatenated together to form the hash bit string.

Alternatively, the elliptic polynomial hash functions may be set up as follows. In the following, let $s_{m_i}$ represent the (nx+ny+1)N-bit string of the $i^{th}$ message block. First, the hash function parameters are set up using:

1) Specifying the values of nx and ny, and the set of coefficients $a_{1k}, a_{2kl}, a_{3k}, c_{1lki}, c_{2kl}, c_{3kli}, b_{1l}, b_{2lk}, b_{3lk}, b_{4k}, b_c \in F$, along with a base point on an elliptic polynomial $(x_{0,B}, x_{1,B}, \ldots, x_{nx,B}, y_{0,B}, y_{1,B}, \ldots, y_{ny,B}) \in EC^{xn+ny+2}$ and base point on its twist $(x_{0,TB}, x_{1,TB}, \ldots, x_{nx,TB}, \sqrt{\alpha} y_{0,B}, y_{1,TB}, \ldots, y_{ny,TB}) \in TEC^{xn+ny+2}$, where all of these coefficients and points are made public;

2) selecting two random numbers $k_1, k_2$ that are kept secret for the specific hash function to be used;

3) computing the multiplication of the scalar $k_1$ with the point $(x_{0,B}, x_{1,B}, \ldots, x_{nx,B}, y_{0,B}, y_{1,B}, \ldots, y_{ny,B})$ to obtain the scalar multiplication, $(x_{0,Pu}, x_{1,Pu}, \ldots, x_{nx,Pu}, y_{0,Pu}, y_{1,Pu}, \ldots, y_{ny,Pu}) = k_1(x_{0,B}, x_{1,B}, \ldots, x_{nx,B}, y_{0,B}, y_{1,B}, \ldots, y_{ny,B})$, and the multiplication of the scalar $k_2$ with the point $(x_{0,TB}, x_{1,TB}, \ldots, x_{nx,TB}, \sqrt{\alpha} y_{0,B}, y_{1,TB}, \ldots, y_{ny,TB})$ to obtain the scalar multiplication: $(x_{0,TPu}, x_{1,TPu}, \ldots, x_{nx,TPu}, \sqrt{\alpha} y_{0,TPu}, y_{1,TPu}, \ldots, y_{ny,TPu}) = k_2(x_{0,TB}, x_{1,TB}, \ldots, x_{nx,TB}, \sqrt{\alpha} y_{0,B}, y_{1,TB}, \ldots, y_{ny,TB})$;

4) making the two scalar multiplication points $(x_{0,Pu}, x_{1,Pu}, \ldots, x_{nx,Pu}, y_{0,Pu}, y_{1,Pu}, \ldots, y_{ny,Pu})$ and $(x_{0,TPu}, x_{1,TPu}, \ldots, x_{nx,TPu}, \sqrt{\alpha} y_{0,TPu}, y_{1,TPu}, \ldots, y_{ny,TPu})$ public; and 5) selecting an initial vector $S_{m1}$ and making it public.

Next, the hash bit string of the message bits string is generated using the following method:

1) Pre-processing the message bit string to obtain a bit string that is a multiple of (nx+ny+1)N-bits;

2) computing the initial hash point $(x_{0,c_1}, x_{1,c_1}, \ldots, x_{nx,c_1}, y_{0,c_1}, y_{1,c_1}, \ldots, y_{ny,c_1})$ on the elliptic polynomial by multiplying the scalar integer value $k_{m_0}$ of the (nx+ny+1)N-bit string of the initial block of the message with the point $(x_{0,Pu},$ $x_{1,Pu}, \ldots, x_{nx,Pu}, y_{0,Pu}, y_{1,Pu}, \ldots, y_{ny,Pu}$) such that ($x_{0,c_1}, x_{1,c_1}, \ldots, x_{nx,c_1}, y_{0,c_1}, y_{1,c_1}, \ldots, y_{ny,c_1}$)=$k_{m_0}(x_{0,Pu}, x_{1,Pu}, \ldots, x_{nx,Pu}, y_{0,Pu}, y_{1,Pu}, \ldots, y_{ny,Pu}$);

(3) computing the initial hash point ($x_{0,Tc_1}, x_{1,Tc_1}, \ldots, x_{nx,Tc_1}, \sqrt{\alpha}y_{0,Tc_1}, y_{1,Tc_1}, \ldots, y_{ny,Tc_1}$) on the twist of the elliptic polynomial by multiplying the scalar integer value $k_{m_1}$ of the (nx+ny+1)N-bit string of the next block of the message with a point ($x_{0,TPu}, x_{1,TPu}, \ldots, x_{nx,TPu}, \sqrt{\alpha}y_{0,TPu}, y_{1,TPu}, \ldots, y_{ny,TPu}$) such that: ($x_{0,Tc_1}, x_{1,Tc_1}, \ldots, x_{nx,Tc_1}, \sqrt{\alpha}y_{0,Tc_1}, y_{1,Tc_1}, \ldots, y_{ny,Tc_1}$)=$k_{m_1}(x_{0,TPu}, x_{1,TPu}, \ldots, x_{nx,TPu}, \sqrt{\alpha}y_{0,TPu}, y_{1,TPu}, \ldots, y_{ny,TPu}$);

1) Pre-processing the message bit string to obtain a bit string that is a multiple of (nx+ny+1)N-bits;

2) computing the point ($x_{0,S_1}, x_{1,S_1}, \ldots, x_{nx,S_1}, y_{0,S_1}, y_{1,S_1}, \ldots, x_{ny,S_1}$) on the elliptic polynomial by multiplying the scalar integer value $k_{m_0}$ of the N-bit string of the initial block of the message with the point ($x_{0,Pu}, x_{1,Pu}, \ldots, x_{nx,Pu}, y_{0,Pu}, y_{1,Pu}, \ldots, y_{ny,Pu}$) such that: ($x_{0,S_1}, x_{1,S_1}, \ldots, x_{nx,S_1}, y_{0,S_1}, y_{1,S_1}, \ldots, y_{ny,S_1}$)=$k_{m_0}(x_{0,Pu}, x_{1,Pu}, \ldots, x_{nx,Pu}, y_{0,Pu}, y_{1,Pu}, \ldots, y_{ny,Pu}$)

3) computing the initial hash point ($x_{0,TS_1}, x_{1,TS_1}, \ldots, x_{nx,TS_1}, \sqrt{\alpha}y_{0,TS_1}, y_{1,TS_1}, \ldots, y_{ny,TS_1}$) on the twist of the elliptic polynomial by multiplying the scalar integer value $k_{m_1}$ of the N-bit string of the next block of the message with a point ($x_{0,TPu}, x_{1,TPu}, \ldots, x_{nx,TPu}, \sqrt{\alpha}y_{0,TPu}, y_{1,TPu}, \ldots, y_{ny,TPu}$), such that: ($x_{0,TS_1}, x_{1,TS_1}, \ldots, x_{nx,TS_1}, \sqrt{\alpha}y_{0,TS_1}, y_{1,TS_1}, \ldots, y_{ny,TS_1}$)=$k_{m_1}(x_{0,TPu}, x_{1,TPu}, \ldots, x_{nx,TPu}, \sqrt{\alpha}y_{0,TPu}, y_{1,TPu}, \ldots, y_{ny,TPu}$);

4) initializing the hash points as follows: ($x_{0,c_1}, x_{1,c_1}, \ldots, x_{nx,c_1}, y_{0,c_1}, y_{1,c_1}, \ldots, y_{ny,c_1}$)=($x_{0,S_1}, x_{1,S_1}, \ldots, x_{nx,S_1}, y_{0,S_1}, y_{1,S_1}, \ldots, x_{ny,S_1}$), and ($x_{0,Tc_1}, x_{1,Tc_1}, \ldots, x_{nx,Tc_1}, \sqrt{\alpha}y_{0,Tc_1}, y_{1,Tc_1}, \ldots, y_{ny,Tc_1}$)=($x_{0,TS_1}, x_{1,TS_1}, \ldots, x_{nx,TS_1}, \sqrt{\alpha}y_{0,TS_1}, y_{1,TS_1}, \ldots, x_{ny,TS_1}$);

Then, starting with i=2, repeating steps 5 to 8 until i>u:

5) computing the (nx+ny+1)N-bit string $S_{m_i}'$ as $S_{m_i}'=S_{m_i} \oplus S_{m_{i-1}}$;

6) embedding the message (nx+ny+1)N-bit string $S_{m_i}'$ of the $i^{th}$ block into the (nx+1) x-coordinates $x_0, x_1, \ldots, x_{nx}$, and the ny y-coordinates $y_1, \ldots, y_{ny}$ of the elliptic message point ($x_{0,m_i}, x_{1,m_i}, \ldots, x_{nx,m_i}, \sqrt{\alpha}y_{0,m_i}, y_{1,m_i}, \ldots, y_{ny,m_i}$) using the non-iterative embedding method described below;

7) doubling the points ($x_{0,S_i}, x_{1,S_i}, \ldots, x_{nx,S_i}, y_{0,S_i}, y_{1,S_i}, \ldots, y_{ny,S_i}$) and ($x_{0,TS_i}, x_{1,TS_i}, \ldots, x_{nx,TS_i}, \sqrt{\alpha}y_{0,TS_i}, y_{1,TS_i}, \ldots, y_{ny,TS_i}$), such as: ($x_{0,S_i}, x_{1,S_i}, \ldots, x_{nx,S_i}, y_{0,S_i}, y_{1,S_i}, \ldots, x_{ny,S_i}$)=2($x_{0,S_{i-1}}, x_{1,S_{i-1}}, \ldots, x_{nx,S_{i-1}}, y_{0,S_{i-1}}, y_{1,S_{i-1}}, \ldots, y_{ny,S_{i-1}}$) and ($x_{0,TS_i}, x_{1,TS_i}, \ldots, x_{nx,TS_i}, \sqrt{\alpha}y_{0,TS_i}, y_{1,TS_i}, \ldots, x_{ny,TS_i}$)=2($x_{0,TS_{i-1}}, x_{1,TS_{i-1}}, \ldots, x_{nx,TS_{i-1}}, \sqrt{\alpha}y_{0,TS_{i-1}}, y_{1,TS_{i-1}}, \ldots, y_{ny,TS_{i-1}}$);

8) if the message point of the $i^{th}$ block is on the elliptic polynomial (i.e., $\alpha_{m_i}$=1), then the hash points are computed using ($x_{0,c_i}, x_{1,c_i}, \ldots, x_{nx,c_i}, y_{0,c_i}, y_{1,c_i}, \ldots, y_{ny,c_i}$)=($x_{0,m_i}, x_{1,m_i}, \ldots, x_{nx,m_i}, y_{0,m_i}, y_{1,m_i}, \ldots, y_{ny,m_i}$)+ ($x_{0,S_i}, x_{1,S_i}, \ldots, x_{nx,S_i}, y_{0,S_i}, y_{1,S_i}, \ldots, x_{ny,S_i}$)+($x_{0,m_{i-1}}, x_{1,m_{i-1}}, \ldots, x_{nx,m_{i-1}}, y_{0,m_{i-1}}, y_{1,m_{i-1}}, \ldots, y_{ny,m_{i-1}}$) and ($x_{0,Tc_i}, x_{1,Tc_i}, \ldots, x_{nx,Tc_i}, \sqrt{\alpha}y_{0,Tc_i}, y_{1,Tc_i}, \ldots, y_{ny,Tc_i}$)=($x_{0,Tc_{i-1}}, x_{1,Tc_{i-1}}, \ldots, x_{nx,Tc_{i-1}}, \sqrt{\alpha}y_{0,Tc_{i-1}}, y_{1,Tc_{i-1}}, \ldots, y_{ny,Tc_{i-1}}$), otherwise, they are computed using: ($x_{0,Tc_i}, x_{1,Tc_i}, \ldots, x_{nx,Tc_i}, \sqrt{\alpha}y_{0,Tc_i}, y_{1,Tc_i}, \ldots, y_{ny,Tc_i}$)=($x_{0,m_i}, x_{1,m_i}, \ldots, x_{nx,m_i}, \sqrt{\alpha}y_{0,m_i}, y_{1,m_i}, \ldots, y_{ny,m_i}$)+($x_{0,TS_i}, x_{1,TS_i}, \ldots, x_{nx,TS_i}, \sqrt{\alpha}y_{0,TS_i}, y_{1,TS_i}, \ldots, y_{ny,TS_i}$)+($x_{0,m_{i-1}}, x_{1,m_{i-1}}, \ldots, x_{nx,m_{i-1}}, \sqrt{\alpha}y_{0,m_{i-1}}, y_{1,m_{i-1}}, \ldots, y_{ny,m_{i-1}}$) and ($x_{0,c_i}, x_{1,c_i}, \ldots, x_{nx,c_i}, y_{0,c_i}, y_{1,c_i}, \ldots, y_{ny,c_i}$)=($x_{0,c_{i-1}}, x_{1,c_{i-1}}, \ldots, x_{nx,c_{i-1}}, y_{0,c_{i-1}}, y_{1,c_{i-1}}, \ldots, y_{ny,c_{i-1}}$);

9) the appropriate bits of the x-coordinates $x_{0,c}, x_{1,c}, \ldots, c_{nx,c}$, y-coordinates $y_{1,c}, \ldots, y_{ny,c}$ and the sign bit of $y_{0,c}$ the hash point ($x_{0,c_u}, x_{1,c_u}, \ldots, x_{nx,c_u}, y_{0,c_u}, y_{1,c_u}, \ldots, y_{ny,c_u}$), and the appropriate bits of the x-coordinates, $x_{0,Tc}, x_{1,Tc}, \ldots, x_{nx,Tc}$, y-coordinates $y_{1,Tc}, \ldots, y_{ny,Tc}$ and the sign bit of $y_{0,Tc}$ of the hash point ($x_{0,Tc_u}, x_{1,Tc_u}, \ldots, x_{nx,Tc_u}, \sqrt{\alpha}y_{0,Tc_u}, y_{1,Tc_u}, \ldots, y_{ny,Tc_u}$) are concatenated together to form the hash bit string.

The above methods may also be applied to find the hash bit string for bit streams of media data, such as text, audio, video, or multimedia data. The hash functions described above can further be applied to the verification of media data. For efficiency of computation, the above methods are used with a pre-processing stage that is used to compress the media data prior to the application of the hash functions. Either a lossless compression method or a lossy compression method can be used to compress the media data in the pre-processing stage. The bit string of the compressed message at the output of the pre-processing stage is then used as the input to the hash generation methods.

In the following, it is assumed that the maximum block size that can be embedded into the (nx+1) x-coordinates and the ny y-coordinates is (nx+ny+1)N bits, and that the compressed media data bit string length is a multiple of (nx+ny+1)N, for example, (u+1) (nx+ny+1)N. In other words, the number of (nx+ny+1)N-bit blocks in a message bit string is (u+1).

Following this, the elliptic polynomial hash functions may be set up as follows. First, the hash function parameters are set up using the following steps:

1) Specifying the values of nx and ny, and the set of coefficients $a_{1k}, a_{2kl}, a_{3k}, c_{1lki}, c_{2kl}, c_{3kli}, b_{1l}, b_{2lk}, b_{3lk}, b_{4k}, b_c \in F$, along with a base point on an elliptic polynomial ($x_{0,B}, x_{1,B}, \ldots, x_{nx,B}, y_{0,B}, y_{1,B}, \ldots, y_{ny,B}) \in EC^{nx+ny+2}$ and base point on the twist ($x_{0,TB}, x_{1,TB}, \ldots, x_{nx,TB}, \sqrt{\alpha}y_{0,B}, y_{1,TB}, \ldots, y_{ny,TB}) \in TEC^{nx+ny+2}$, where all of these coefficients and points are made public;

2) selecting two random numbers $k_1, k_2$ that are kept secret for the specific hash function to be used;

3) computing the multiplication of the scalar $k_1$ with the point ($x_{0,B}, x_{1,B}, \ldots, x_{nx,B}, y_{0,B}, y_{1,B}, \ldots, y_{ny,B}$) to obtain the scalar multiplication, ($x_{0,Pu}, x_{1,Pu}, \ldots, x_{nx,Pu}, y_{0,Pu}, y_{1,Pu}, \ldots, y_{ny,Pu} \ldots$)=$k_1(x_{0,B}, x_{1,B}, \ldots, x_{nx,B}, y_{0,B}, y_{1,B}, \ldots, y_{ny,B}$), and the multiplication of the scalar $k_2$ with the point ($x_{0,TB}, x_{1,TB}, \ldots, x_{nx,TB}, \sqrt{\alpha}y_{0,B}, y_{1,TB}, \ldots, y_{ny,TB}$) to obtain the scalar multiplication: ($x_{0,TPu}, x_{1,TPu}, \ldots, x_{nx,TPu}, \sqrt{\alpha}y_{0,TPu}, y_{1,TPu}, \ldots, y_{ny,TPu}$)=$k_2(x_{0,TB}, x_{1,TB}, \ldots, x_{nx,TB}, \sqrt{\alpha}y_{0,B}, y_{1,TB}, \ldots, y_{ny,TB}$);

4) making the two scalar multiplication points ($x_{0,Pu}, x_{1,Pu}, \ldots, x_{nx,Pu}, y_{0,Pu}, y_{1,Pu}, \ldots, y_{ny,Pu}$) and ($x_{0,TPu}, x_{1,TPu}, \ldots, x_{nx,TPu}, \sqrt{\alpha}y_{0,TPu}, y_{1,TPu}, \ldots, y_{ny,TPu}$) public; and 5) specifying a media compression method and making it public.

Next, the hash bit string of the message bits string is generated using the following method:

1) compressing the media data to be sent using the agreed upon method to generate a compressed message data bit string and dividing the bit string into blocks of (nx+ny+1)N bits;

2) pre-processing the message bit string to obtain a bit string that is a multiple of (nx+ny+1)N-bits;

3) computing the point ($x_{0,S_1}, x_{1,S_1}, \ldots, x_{nx,S_1}, y_{0,S_1}, y_{1,S_1}, \ldots, x_{ny,S_1}$) on the elliptic polynomial by multiplying the scalar integer value $k_{m_0}$ of the N-bit string of the initial block of the message with the point ($x_{0,Pu}, x_{1,Pu}, \ldots, x_{nx,Pu}, y_{0,Pu}, y_{1,Pu}, \ldots, y_{ny,Pu}$) such that ($x_{0,S_1}, x_{1,S_1}, \ldots, x_{nx,S_1}, y_{0,S_1}, y_{1,S_1}, \ldots, y_{ny,S_1}$)=$k_{m_0}(x_{0,Pu}, x_{1,Pu}, \ldots, x_{nx,Pu}, y_{0,Pu}, y_{1,Pu}, \ldots, y_{ny,Pu}$); and 4) computing the initial hash point ($x_{0,TS_1}, x_{1,TS_1}, \ldots, x_{nx,TS_1}, \sqrt{\alpha}y_{0,TS_1}, y_{1,TS_1}, \ldots, y_{ny,TS_1}$) on the twist of the elliptic polynomial by multiplying the scalar integer value $k_{m_1}$ of the N-bit string of the next block of the message with a point $(x_{0,TPu}, x_{1,TPu}, \ldots, x_{nx,TPu}, \sqrt{\alpha}y_{0,TPu}, y_{1,TPu}, \ldots, y_{ny,TPu})$, such that: $(x_{0,TS_1}, x_{1,TS_1}, \ldots, x_{nx,TS_1}, \sqrt{\alpha}y_{0,TS_1}, y_{1,TS_1}, \ldots, y_{ny,TS_1}) = k_{m_1}(x_{0,TPu}, x_{1,TPu}, \ldots, x_{nx,TPu}, \sqrt{\alpha}y_{0,TPu}, y_{1,TPu}, \ldots, y_{ny,TPu})$; Then, starting with i=2, repeating steps 5 and 6 until i>u:

5) embedding the message (nx+ny+1)N-bit string of the $i^{th}$ block into the (nx+1) x-coordinates $X_0, x_1, \ldots, x_{nx}$ and the ny y-coordinates $y_1, \ldots, y_{ny}$, of the elliptic message point $(x_{0,m_i}, x_{1,m_i}, \ldots, x_{nx,m_i}, \sqrt{\alpha_{m_i}}y_{0,m_i}, y_{1,m_i}, \ldots, y_{ny,m_i})$ using the non-iterative embedding method described below;

6) if the message point of the $i^{th}$ block is on the elliptic polynomial (i.e., $\alpha_{m_i}=1$), then the hash points are computed using: $(x_{0,c_i}, x_{1,c_i}, \ldots, x_{nx,c_i}, y_{0,c_i}, y_{1,c_i}, \ldots, y_{ny,c_i}) = (x_{0,m_i}, x_{1,m_i}, \ldots, x_{nx,m_i}, y_{0,m_i}, y_{1,m_i}, \ldots, y_{ny,m_i}) + (x_{0,S_i}, x_{1,S_i}, \ldots, x_{nx,S_i}, y_{0,S_i}, y_{1,S_i}, \ldots, x_{ny,S_i}) + (x_{0,m_{i-1}}, x_{1,m_{i-1}}, \ldots, x_{nx,m_{i-1}}, y_{0,m_{i-1}}, y_{1,m_{i-1}}, \ldots, x_{ny,m_{i-1}})$ and $(x_{0,Tc_i}, x_{1,Tc_i}, \ldots, x_{nx,Tc_i}, \sqrt{\alpha}y_{0,Tc_i}, y_{1,Tc_i}, \ldots, y_{ny,Tc_i}) = (x_{0,Tc_{i-1}}, x_{1,Tc_{i-1}}, \ldots, x_{nx,Tc_{i-1}}, \sqrt{\alpha}y_{0,Tc_{i-1}}, y_{1,Tc_{i-1}}, \ldots, x_{ny,Tc_{i-1}})$, otherwise, they are computed using: $(x_{0,Tc_i}, x_{1,Tc_i}, \ldots, x_{nx,Tc_i}, \sqrt{\alpha}y_{0,Tc_i}, y_{1,Tc_i}, \ldots, y_{ny,Tc_i}) = (x_{0,m_i}, x_{1,m_i}, \ldots, x_{nx,m_i}, \sqrt{\alpha}y_{0,m_i}, y_{1,m_i}, \ldots, y_{ny,m_i}) + (x_{0,TS_i}, x_{1,TS_i}, \ldots, x_{nx,TS_i}, \sqrt{\alpha}y_{0,TS_i}, y_{1,TS_i}, \ldots, x_{ny,TS_i}) + (x_{0,m_{i-1}}, x_{1,m_{i-1}}, \ldots, x_{nx,m_{i-1}}, \sqrt{\alpha}y_{0,m_{i-1}}, y_{1,m_{i-1}}, \ldots, y_{ny,m_{i-1}})$ and $(x_{0,c_i}, x_{1,c_i}, \ldots, x_{nx,c_i}, y_{0,c_i}, y_{1,c_i}, \ldots, y_{ny,c_i}) = (x_{0,c_{i-1}}, x_{1,c_{i-1}}, \ldots, x_{nx,c_{i-1}}, y_{0,c_{i-1}}, y_{1,c_{i-1}}, \ldots, x_{ny,c_{i-1}})$; and 7) the appropriate bits of the x-coordinates $x_{0,c}, x_{1,c}, \ldots, x_{nx,c}$, the y-coordinates $y_{1,c}, \ldots, y_{ny,c}$ and a sign bit of $y_{0,c}$ of the hash point $(x_{0,c_u}, x_{1,c_u}, \ldots, x_{nx,c_u}, y_{0,c_u}, y_{1,c_u}, \ldots, y_{ny,c_u})$, and the appropriate bits of the x-coordinates $x_{0,Tc}, x_{1,Tc}, \ldots, x_{nx,Tc}$, the y-coordinates $y_{1,Tc}, \ldots, y_{ny,Tc}$ and a sign bit of $y_{0,Tc}$ of the hash point $(x_{0,Tc_u}, x_{1,Tc_u}, \ldots, x_{nx,Tc_u}, \sqrt{\alpha}y_{0,Tc_u}, y_{1,Tc_u}, \ldots, y_{ny,Tc_u})$ are concatenated together to form the hash bit string.

As noted above, the methods described herein include data embedding. The embedding of a message bit string into an elliptic point that satisfies an elliptic polynomial equation with (nx+1) x-coordinates and (ny+1) y-coordinates is carried out as follows:

1) dividing the message bit string into M-bit strings, where $((nx+ny+1)N-L) > M > (N-L)$;

2) dividing each M-bit string into (nx+ny+1) strings $mx_0, mx_1, \ldots, mx_{nx}, my_1, \ldots, my_{ny}$, where the length of string $mx_0$ must be no more than (N-L) bits, while the length of each of the other (nx+ny) strings $mx_1, \ldots, mx_{nx}, my_1, \ldots, my_{ny}$ must be no more than N bits, and where each one of the (nx+ny+1) bit strings must have an equivalent value which is an element of the underlying field F;

3) assigning the value of the bit strings of $mx_1, \ldots, mx_{nx}$ to $x_1, \ldots, x_{nx}$;

4) assigning the value of the bit strings of $my_1, \ldots, my_{ny}$ to $y_1, \ldots, y_{ny}$;

5) assigning the value of the bit string of $mx_0$ to $x_0$;

6) substituting the values of $x_0, x_1, \ldots, x_{nx}$ and $y_1, \ldots, y_{ny}$ in a selected elliptic polynomial equation with (nx+1) x-coordinates and (ny+1) y-coordinates to form a quadratic equation in $y_0$: $y_0^2 + Ay_0 + B = 0$;

7) If the quadratic equation in $y_0$ has solutions $\bar{y}_{0,1}, \bar{y}_{0,2}$ where the solutions are elements of the finite field F, then assign one of the solutions to $y_0$ at random or according to a certain rule, and the message point is given by $(x_{0,m}, x_{1,m}, \ldots, x_{nx,m}, y_{0,m}, y_{1,m}, \ldots, y_{ny,m})$; otherwise, assign one of the solutions $\sqrt{\alpha}y_{0,1}$ & $\sqrt{\alpha}y_{0,2}$ to $y_0$ at random or according to a certain rule, and the message point is give by $(x_{0,m}, x_{1,m}, \ldots, x_{nx,m}, \sqrt{\alpha}y_{0,m}, y_{1,m}, \ldots, y_{ny,m})$.

The message point is then denoted as $(x_{0,m}, x_{1,m}, \ldots, x_{nx,m}, \sqrt{\alpha}y_{0,m}, y_{1,m}, \ldots, y_{ny,m})$, where the point is on the elliptic polynomial if $\alpha_{m_i}=1$, and the point is on the twist if $\alpha_{m_i}=\bar{\alpha}$.

It should be noted that in the case of quadratic equations with A=0, the Legendre symbol can be used as an efficient test for the existence of a solution of the quadratic equation above.

In the above, the hash functions use the scalar multiplication $k_m(x_{P_u}, y_{P_u})$. It should be noted that, in order to find a collision means, that there are two message bits strings m and m' such that their integer values $k_m$ and $k_{m'}$ will lead to $k_m k(x_B, y_B) = k_{m'} k(x_B, y_B)$. This collision implies that integers can be found such that $k_m k - k_{m'} k = l^* \#EC$, where #EC is the order of the group (EC, +). This is equivalent to solving the elliptic polynomial discrete logarithm problem. This also applies to finding a collision for the points on the twist of an elliptic polynomial, $k_m k(x_{TB}, \sqrt{\alpha}y_{TB}) = k_{m'} k(x_{TB}, \sqrt{\alpha}y_{TB})$.

Thus, security of the hash functions depends on the security of the underlying elliptic polynomial cryptography. The security of elliptic polynomial cryptosystems is assessed by both the effect on the solution of the elliptic polynomial discrete logarithmic problem (ECDLP) and power analysis attacks.

It is well known that the elliptic polynomial discrete logarithm problem (ECDLP) is apparently intractable for non-singular elliptic polynomials. The ECDLP problem can be stated as follows: given an elliptic polynomial defined over F that needs N-bits for the representation of its elements, an elliptic polynomial point $(x_P, y_P) \in EC$, defined in affine coordinates, and a point $(x_Q, y_Q) \in EC$, defined in affine coordinates, determine the integer k, $0 \leq k \leq \#F$, such that $(x_Q, y_Q) = k(x_P, y_P)$, provided that such an integer exists. In the below, it is assumed that such an integer exists.

The most well known attack used against the ECDLP is the Pollard $\rho$-up method, which has a complexity of $O(\sqrt{\pi K}/2)$, where K is the order of the underlying group, and the complexity is measured in terms of an elliptic polynomial point addition.

Since the underlying cryptographic problems used in the above block cipher chaining methods is the discrete logarithm problem, which is a known hard mathematical problem, it is expected that the security of the above methods are more secure than prior art ciphers which are not based on such a mathematically hard problem.

It will be understood that the hash functions with elliptic polynomial polynomial hopping described above may be implemented by software stored on a medium readable by a computer and executing as set of instructions on a processor (including a microprocessor, microcontroller, or the like) when loaded into main memory in order to carry out a cryptographic system of secure communications in a computer network. As used herein, a medium readable by a computer includes any form of magnetic, optical, mechanical, laser, or other media readable by a computer, including floppy disks, hard disks, compact disks (CDs), digital versatile disk (DVD), laser disk, magnetic tape, paper tape, punch cards, flash memory, etc.

It is to be understood that the present invention is not limited to the embodiments described above, but encompasses any and all embodiments within the scope of the following claims.

We claim:

1. A method of generating cryptographic hash functions using elliptic polynomial cryptography in an electronic communications system, comprising the steps of:

a) generating a set of hash function parameters, including the steps of:

b) establishing a two-dimensional Cartesian coordinate system having orthogonal coordinates x and y, establishing natural numbers n and N, wherein a message string to be encrypted is divided into N bit strings, and establishing a finite field F, an elliptic polynomial EC and a twist of the elliptic polynomial TEC;

c) specifying values of nx and ny, and a set of coefficients $a_{1k}$, $a_{2kl}$, $a_{3k}$, $c_{1lki}$, $c_{2kl}$, $c_{3kli}$, $b_{1l}$, $b_{2lk}$, $b_{3lk}$, $b_{4k}$, $b_c \in F$, along with a base point on an elliptic polynomial $(x_{0,B}, x_{1,B}, \ldots, x_{nx,B}, y_{0,B}, y_{1,B}, \ldots, y_{ny,B}) \in EC^{xn+ny+2}$ and a base point on the twist of the elliptic polynomial $(x_{0,TB}, x_{1,TB}, \ldots, x_{nx,TB}, \sqrt{\alpha}y_{0,B}, y_{1,TB}, \ldots, y_{ny,TB}) \in TEC^{xn+ny+2}$;

d) disclosing the values of nx and ny, the set of coefficients, the base point on the elliptic polynomial and the base point on the twist as public information;

e) selecting a pair of random number scalars $k_1$, $k_2$ that are kept secret for a specific hash function to be used;

f) computing the multiplication of the scalar $k_1$ with a point $(x_{0,B}, x_{1,B}, \ldots, x_{nx,B}, y_{0,B}, y_{1,B}, \ldots, y_{ny,B})$ to obtain a scalar multiplication such that $(x_{0,Pu}, x_{1,Pu}, \ldots, x_{nx,Pu}, y_{0,Pu}, y_{1,Pu}, \ldots, y_{ny,Pu}) = k_1(x_{0,B}, x_{1,B}, \ldots, x_{nx,B}, y_{0,B}, y_{1,B}, \ldots, y_{ny,B})$;

g) computing the multiplication of the scalar $k_2$ with a point $(x_{0,TB}, x_{1,TB}, \ldots, x_{nx,TB}, \sqrt{\alpha}y_{0,B}, y_{1,TB}, \ldots, y_{ny,TB})$ to obtain a scalar multiplication such that $(x_{0,TPu}, x_{1,TPu}, \ldots, x_{nx,TPu}, \sqrt{\alpha}y_{0,TPu}, y_{1,TPu}, \ldots, y_{ny,TPu}) = k_1(x_{0,TB}, x_{1,TB}, \ldots, x_{nx,TB}, \sqrt{\alpha}y_{0,TB}, y_{1,TB}, \ldots, y_{ny,TB})$;

h) disclosing the scalar multiplication points $(x_{0,Pu}, x_{1,Pu}, \ldots, x_{nx,Pu}, y_{0,Pu}, y_{1,Pu}, \ldots, y_{ny,Pu})$ and $(x_{0,TPu}, x_{1,TPu}, \ldots, x_{nx,TPu}, \sqrt{\alpha}y_{0,TPu}, y_{1,TPu}, \ldots, y_{ny,TPu})$ as public information;

i) generating a hash bit string of the message bit string, including the steps of:

j) preprocessing the message bit string to obtain a bit string which is a multiple of (nx+ny+1)N-bits;

k) computing an initial hash point $(x_{0,c_1}, x_{1,c_1}, \ldots, x_{nx,c_1}, y_{0,c_1}, y_{1,c_1}, \ldots, y_{ny,c_1})$ on the elliptic polynomial by multiplying a scalar integer value $k_{m_0}$ of the (nx+ny+1)N-bit string of an initial block of the message bit string with a point $(x_{0,Pu}, x_{1,Pu}, \ldots, x_{nx,Pu}, y_{0,Pu}, y_{1,Pu}, \ldots, y_{ny,Pu})$ such that $(x_{0,c_1}, x_{1,c_1}, \ldots, x_{nx,c_1}, y_{0,c_1}, y_{1,c_1}, \ldots, y_{ny,c_1}) = k_{m_0}(x_{0,Pu}, x_{1,Pu}, \ldots, x_{nx,Pu}, y_{0,Pu}, y_{1,Pu}, \ldots, y_{ny,Pu})$;

l) computing an initial hash point $(x_{0,Tc_1}, x_{1,Tc_1}, \ldots, x_{nx,Tc_1}, \sqrt{\alpha}y_{0,Tc_1}, y_{1,Tc_1}, \ldots, y_{ny,Tc_1})$ on the twist of the elliptic polynomial by multiplying a scalar integer value $k_{m_1}$ of the (nx+ny+1)N-bit string of the next block of the message bit string with a point $(x_{0,TPu}, x_{1,TPu}, \ldots, x_{nx,TPu}, \sqrt{\alpha}y_{0,TPu}, y_{1,TPu}, \ldots, y_{ny,TPu})$ such that: $(x_{0,Tc_1}, x_{1,Tc_1}, \ldots, x_{nx,Tc_1}, \sqrt{\alpha}y_{0,Tc_1}, y_{1,Tc_1}, \ldots, y_{ny,Tc_1}) = k_{m_1}(x_{0,TPu}, x_{1,TPu}, \ldots, x_{nx,TPu}, \sqrt{\alpha}y_{0,TPu}, y_{1,TPu}, \ldots, y_{ny,TPu})$;

m) establishing integer values i and u with an initial value of i=2, and repeating the following steps n) and o) until i>u:

n) embedding a (nx+ny+1)N-bit string of the $i^{th}$ block of the message bit string into (nx+1) x-coordinates $X_0$, $x_1, \ldots, x_{nx}$ and ny y-coordinates $y_1, \ldots, y_{ny}$ of the elliptic message point $(x_{0,m_i}, x_{1,m_i}, \ldots, x_{nx,m_i}, \sqrt{\alpha_{m_i}}y_{0,m_i}, y_{1,m_i}, \ldots, y_{ny,m_i})$ using non-iterative embedding;

o) if the message point of the $i^{th}$ block is on the elliptic polynomial then computing the hash points as: $(x_{0,c_i}, x_{1,c_i}, \ldots, x_{nx,c_i}, y_{0,c_i}, y_{1,c_i}, \ldots, y_{ny,c_i}) = (x_{0,m_i}, x_{1,m_i}, \ldots, x_{nx,m_i}, y_{0,m_i}, y_{1,m_i}, \ldots, y_{ny,m_i}) + (x_{0,c_{i-1}}, x_{1,c_{i-1}}, \ldots, x_{nx,c_{i-1}}, y_{0,c_{i-1}}, y_{1,c_i}, \ldots, x_{ny,c_{i-1}})$
and $(x_{0,Tc_i}, x_{1,Tc_i}, \ldots, x_{nx,Tc_i}, \sqrt{\alpha}y_{0,Tc_i}, y_{1,Tc_i}, \ldots, y_{ny,Tc_i}) = (x_{0,Tc_{i-1}}, x_{1,Tc_{i-1}}, \ldots, x_{nx,Tc_{i-1}}, \sqrt{\alpha}y_{0,Tc_{i-1}}, y_{1,Tc_{i-1}}, \ldots, x_{ny,Tc_{i-1}})$, otherwise,
computing the hash points as: $(x_{0,Tc_i}, x_{1,Tc_i}, \ldots, x_{nx,Tc_i}, \sqrt{\alpha}y_{0,Tc_i}, y_{1,Tc_i}, \ldots, y_{ny,Tc_i}) = (x_{0,m_i}, x_{1,m_i}, \ldots, x_{nx,m_i}, \sqrt{\alpha}y_{0,m_i}, y_{1,m_i}, \ldots, y_{ny,m_i}) + (x_{0,Tc_{i-1}}, x_{1,Tc_{i-1}}, \ldots, x_{nx,Tc_{i-1}}, \sqrt{\alpha}y_{0,Tc_{i-1}}, y_{1,Tc_{i-1}}, \ldots, y_{ny,Tc_{i-1}})$ $(x_{0,c_i}, x_{1,c_i}, \ldots, x_{nx,c_i}, y_{0,c_i}, y_{1,c_i}, \ldots, y_{ny,c_i}) = (x_{0,c_{i-1}}, x_{1,c_{i-1}}, \ldots, x_{nx,c_{i-1}}, y_{0,c_{i-1}}, y_{1,c_i}, \ldots, x_{ny,c_{i-1}})$; and p) concatenating the appropriate bits of the x-coordinates $x_{0,c}, x_{1,c}, \ldots, x_{nx,c}$, the y-coordinates $y_{1,c}, \ldots, y_{ny,c}$ and a sign bit of $y_{0,c}$ of the hash point $(x_{0,c_u}, x_{1,c_u}, \ldots, x_{nx,c_u}, y_{0,c_u}, y_{1,c_u}, \ldots, y_{ny,c_u})$, and the appropriate bits of the x-coordinates $x_{0,Tc}$, $x_1$, Tc, $\ldots$, $x_{nx,Tc}$, the y-coordinates $y_{1,Tc}, \ldots, y_{ny,Tc}$ and a sign bit of $y_{0,Tc}$ of the hash point $(x_{0,Tc_u}, x_{1,Tc_u}, \ldots, x_{nx,Tc_u}, \sqrt{\alpha}y_{0,Tc_u}, y_{1,Tc_u}, \ldots, y_{ny,Tc_u})$ to form the hash bit string.

2. The method of generating cryptographic hash functions as recited in claim 1, wherein the maximum block size that can be embedded into the (nx+1) x-coordinates and the ny y-coordinates is (nx+ny+1)N bits.

3. The method of generating cryptographic hash functions as recited in claim 2, wherein the number of (nx+ny+1)N bit blocks in the message bit string is (u+1).

4. The method of generating cryptographic hash functions as recited in claim 3, wherein said step of embedding comprises the steps of:

a) establishing integers M and L, and dividing the message bit string into M-bit strings such that ((nx+ny+1)N−L)>M>(N−L);

b) dividing each M-bit string into (nx+ny+1) strings $mx_0$, $mx_1, \ldots, mx_{nx}, my_1, \ldots, my_{ny}$, wherein the length of the string $mx_0$ is less than or equal to (N−L) bits, and the length of each of the remaining (nx+ny) strings $mx_1, \ldots, mx_{nx}, my_1, \ldots, my_{ny}$ are each less than or equal to N bits, wherein each one of the (nx+ny+1) bit strings has an equivalent value which is an element of the finite field F;

c) assigning the value of the bit strings of $mx_1, \ldots, mx_{nx}$ to $x_1, \ldots, x_{nx}$;

d) assigning the value of the bit strings of $my_1, \ldots, my_{ny}$ to $y_1, \ldots, y_{ny}$;

e) assigning the value of the bit string of $mx_0$ to $x_0$;

f) substituting the values of $x_0, x_1, \ldots, x_{nx}$ and $y_1, \ldots, y_{ny}$ in the selected elliptic polynomial equation with (nx+1) x-coordinates and (ny+1) y-coordinates to form a quadratic equation in $y_0$ of the form $y_0^2 + Ay_0 + B = 0$, wherein A and B are variables; and g) if the quadratic equation in $y_0$ has solutions $\bar{y}_{0,1}, \bar{y}_{0,2}$ where the solutions are elements of the finite field F, then assigning one of the solutions to $y_0$, and the message point is given by $(x_{0,m}, x_{1,m}, \ldots, x_{nx,m}, y_{0,m}, y_{1,m}, \ldots, y_{ny,m})$, otherwise, assigning one of the solutions $\sqrt{\alpha}y_{0,1}$ & $\sqrt{\alpha}y_{0,2}$ to $y_0$, and the message point is given by $(x_{0,m}, x_{1,m}, \ldots, x_{nx,m}, \sqrt{\alpha}y_{0,m}, y_{1,m}, \ldots, y_{ny,m})$.

5. The method of generating cryptographic hash functions as recited in claim 4, wherein the assignment of solutions in the method of embedding includes assignment of solutions using a predetermined public method.

6. The method of generating cryptographic hash functions as recited in claim 5, wherein the step of embedding further includes the step of denoting the message point as $(x_{0,m}$, $x_{1,m}, \ldots, x_{nx,m}, \sqrt{\alpha}y_{0,m}, y_{1,m}, \ldots, y_{ny,m})$, wherein the point is on the elliptic polynomial if $\alpha_{m_i}=1$, and the point is on the twist if $\alpha_{m_i}=\overline{\alpha}$.

7. A method of generating cryptographic hash functions in an electronic communications system using elliptic polynomial cryptography, comprising the steps of:

a) generating a set of hash function parameters, including the steps of:

b) establishing an $((nx+1)+(ny+1))$-dimensional Cartesian coordinates system having orthogonal coordinates $x_0, x_1, \ldots, x_{nx}, y_0, y_1, \ldots, y_{ny}$ defined over a finite field F, such that $x_0, x_1, \ldots, x_{nx}, y_0, y_1, \ldots, y_{ny} \in F$, wherein nx and ny are integers establishing an integer number N, wherein the values of the elements of F can be represented in N-bits strings, an elliptic polynomial $EC^{nx+ny+2}$ and a twist of the elliptic polynomial $TEC^{nx+ny+2}$;

c) specifying values of nx and ny, and a set of coefficients $a_{1k}, a_{2kl}, a_{3k}, c_{1lki}, c_{2kl}, c_{3kli}, b_{1l}, b_{2lk}, b_{3lk}, b_{4k}, b_c \in F$, along with a base point on an elliptic polynomial $(x_{0,B}, x_{1,B}, \ldots, x_{nx,B}, y_{0,B}, y_{1,B}, \ldots, y_{ny,B}) \in EC^{xn+ny+2}$ and a base point on the twist of the elliptic polynomial $(x_{0,TB}, x_{1,TB}, \ldots, x_{nx,TB}, \sqrt{\alpha}y_{0,B}, y_{1,TB}, \ldots, y_{ny,TB}) \in TEC^{xn+ny+2}$;

d) disclosing the values of nx and ny, the set of coefficients, the base point on the elliptic polynomial and the base point on the twist as public information;

e) selecting a pair of random number scalars $k_1, k_2$ which are kept secret for a specific hash function to be used;

f) computing the multiplication of the scalar $k_1$ with a point $(x_{0,B}, x_{1,B}, \ldots, x_{nx,B}, y_{0,B}, y_{1,B}, \ldots, y_{ny,B})$ to obtain a scalar multiplication such that $(x_{0,Pu}, x_{1,Pu}, \ldots, x_{nx,Pu}, y_{0,Pu}, y_{1,Pu}, \ldots, y_{ny,Pu}) = k_1(x_{0,B}, x_{1,B}, \ldots, x_{nx,B}, y_{0,B}, y_{1,B}, \ldots, y_{ny,B})$;

g) computing the multiplication of the scalar $k_2$ with a point $(x_{0,TB}, x_{1,TB}, \ldots, x_{nx,TB}, \sqrt{\alpha}y_{0,B}, y_{1,TB}, \ldots, y_{ny,TB})$ to obtain a scalar multiplication such that $(x_{0,TPu}, x_{1,TPu}, \ldots, x_{nx,TPu}, \sqrt{\alpha}y_{0,TPu}, y_{1,TPu}, \ldots, y_{ny,TPu}) = k_1(x_{0,TB}, x_{1,TB}, \ldots, x_{nx,TB}, \sqrt{\alpha}y_{0,TB}, y_{1,TB}, \ldots, y_{ny,TB})$;

h) disclosing the scalar multiplication points $(x_{0,Pu}, x_{1,Pu}, \ldots, x_{nx,Pu}, y_{0,Pu}, y_{1,Pu}, \ldots, y_{ny,Pu})$ and $(x_{0,TPu}, x_{1,TPu}, \ldots, x_{nx,TPu}, \sqrt{\alpha}y_{0,TPu}, y_{1,TPu}, \ldots, y_{ny,TPu})$ as public information;

i) generating a hash bit string of the message bit string, including the steps of:

j) pre-processing the message bit string to obtain a bit string which is a multiple of $(nx+ny+1)$N-bit;

k) computing an initial hash point $(x_{0,S_1}, x_{1,S_1}, \ldots, x_{nx,S_1}, y_{0,S_1}, y_{1,S_1}, \ldots, x_{ny,S_1})$ on the elliptic polynomial by multiplying a scalar integer value $k_{m_0}$ of the $(nx+ny+1)$N-bit string of an initial block of the message bit string with a point $(x_{0,Pu}, x_{1,Pu}, \ldots, x_{nx,Pu}, y_{0,Pu}, y_{1,Pu}, \ldots, y_{ny,Pu})$ such that: $(x_{0,S_1}, x_{1,S_1}, \ldots, x_{nx,S_1}, y_{0,S_1}, y_{1,S_1}, \ldots, y_{ny,S_1}) = k_{m_0}(x_{0,Pu}, x_{1,Pu}, \ldots, x_{nx,Pu}, y_{0,Pu}, y_{1,Pu}, \ldots, y_{ny,Pu})$;

l) computing a point $(x_{0,TS_1}, x_{1,TS_1}, \ldots, x_{nx,TS_1}, \sqrt{\alpha}y_{0,TS_1}, y_{1,TS_1}, \ldots, y_{ny,TS_1})$ on the twist of the elliptic polynomial by multiplying a scalar integer value $k_{m_1}$ of the $(nx+ny+1)$N-bit string of the next block of the message with the point $(x_{0,TPu}, x_{1,TPu}, \ldots, x_{nx,TPu}, \sqrt{\alpha}y_{0,TPu}, y_{1,TPu}, \ldots, y_{ny,TPu})$, such that: $(x_{0,TS_1}, x_{1,TS_1}, \ldots, x_{nx,TS_1}, \sqrt{\alpha}y_{0,TS_1}, y_{1,TS_1}, \ldots, y_{ny,TS_1}) = k_{m_1}(x_{0,TPu}, x_{1,TPu}, \ldots, x_{nx,TPu}, \sqrt{\alpha}y_{0,TPu}, y_{1,TPu}, \ldots, y_{ny,TPu})$;

m) initializing the hash points such that $(x_{0,c_1}, x_{1,c_1}, \ldots, x_{nx,c_1}, y_{0,c_1}, y_{1,c_1}, \ldots, y_{ny,c_1}) = +(x_{0,S_1}, x_{1,S_1}, \ldots, x_{nx,S_1}, y_{0,S_1}, y_{1,S_1}, \ldots, y_{ny,S_1})$, and $(x_{0,Tc_1}, x_{1,Tc_1}, \ldots, x_{nx,Tc_1}, \sqrt{\alpha}y_{0,Tc_1}, y_{1,Tc_1}, \ldots, y_{ny,Tc_1}) = (x_{0,TS_1}, x_{1,TS_1}, \ldots, x_{nx,TS_1}, \sqrt{\alpha}y_{0,TS_1}, y_{1,TS_1}, \ldots, x_{ny,TS_1})$;

n) establishing an integer value i with an initial value of i=2, and repeating the following steps o) through q) until all of the message data blocks are processed, and incrementing i at each step:

o) embedding a $(nx+ny+1)$N-bit string of the $i^{th}$ block of the message bit string into $(nx+1)$ x-coordinates $X_0, x_1, \ldots, x_{nx}$ and ny y-coordinates $y_1, \ldots, y_{ny}$ of the elliptic message point $(x_{0,m_i}, x_{1,m_i}, \ldots, x_{nx,m_i}, \sqrt{\alpha_{m_i}}y_{0,m_i}, y_{1,m_i}, \ldots, y_{ny,m_i})$ using non-iterative embedding;

p) doubling the points $(x_{0,S_i}, x_{1,S_i}, \ldots, x_{nx,S_i}, y_{0,S_i}, y_{1,S_i}, \ldots, x_{ny,S_i})$ and $(x_{0,TS_i}, x_{1,TS_i}, \ldots, x_{nx,TS_i}, \sqrt{\alpha}y_{0,TS_i}, y_{1,TS_i}, \ldots, x_{ny,TS_i})$, such that: $(x_{0,S_i}, x_{1,S_i}, \ldots, x_{nx,S_i}, y_{0,S_i}, y_{1,S_i}, \ldots, x_{ny,S_i}) = 2(x_{0,S_{i-1}}, x_{1,S_{i-1}}, \ldots, x_{nx,S_{i-1}}, y_{0,S_{i-1}}, y_{1,S_{i-1}}, \ldots, x_{ny,S_{i-1}})$ and $(x_{0,TS_i}, x_{1,TS_i}, \ldots, x_{nx,TS_i}, \sqrt{\alpha}y_{0,TS_i}, y_{1,TS_i}, \ldots, x_{ny,TS_i}) = 2(x_{0,TS_{i-1}}, x_{1,TS_{i-1}}, \ldots, x_{nx,TS_{i-1}}, \sqrt{\alpha}y_{0,TS_{i-1}}, y_{1,TS_{i-1}}, \ldots, x_{ny,TS_{i-1}})$;

q) if the message point of the $i^{th}$ block is on the elliptic polynomial, then the hash points are computed using:
$(x_{0,c_i}, x_{1,c_i}, \ldots, x_{nx,c_i}, y_{0,c_i}, y_{1,c_i}, \ldots, y_{ny,c_i}) = (x_{0,m_i}, x_{1,m_i}, \ldots, x_{nx,m_i}, y_{0,m_i}, y_{1,m_i}, \ldots, y_{ny,m_i}) + (x_{0,S_i}, x_{1,S_i}, \ldots, x_{nx,S_i}, y_{0,S_i}, y_{1,S_i}, \ldots, x_{ny,S_i}) + (x_{0,m_{i-1}}, x_{1,m_{i-1}}, \ldots, x_{nx,m_{i-1}}, y_{0,m_{i-1}}, y_{1,m_{i-1}}, \ldots, y_{ny,m_{i-1}})$ and $(x_{0,Tc_i}, x_{1,Tc_i}, \ldots, x_{nx,Tc_i}, \sqrt{\alpha}y_{0,Tc_i}, y_{1,Tc_i}, \ldots, y_{ny,Tc_i}) = (x_{0,Tc_{i-1}}, x_{1,Tc_{i-1}}, \ldots, x_{nx,Tc_{i-1}}, \sqrt{\alpha}y_{0,Tc_{i-1}}, y_{1,Tc_{i-1}}, \ldots, x_{ny,Tc_{i-1}})$,
otherwise, they are computed using:
$(x_{0,Tc_i}, x_{1,Tc_i}, \ldots, x_{nx,Tc_i}, \sqrt{\alpha}y_{0,Tc_i}, y_{1,Tc_i}, \ldots, y_{ny,Tc_i}) = (x_{0,m_i}, x_{1,m_i}, \ldots, x_{nx,m_i}, \sqrt{\alpha}y_{0,m_i}, y_{1,m_i}, \ldots, y_{ny,m_i}) + (x_{0,TS_i}, x_{1,TS_i}, \ldots, x_{nx,TS_i}, \sqrt{\alpha}y_{0,TS_i}, y_{1,TS_i}, \ldots, y_{ny,TS_i}) + (x_{0,m_{i-1}}, x_{1,m_{i-1}}, \ldots, x_{nx,m_{i-1}}, \sqrt{\alpha}y_{0,m_{i-1}}, y_{1,m_{i-1}}, \ldots, x_{ny,m_{i-1}})$ and $(x_{0,c_i}, x_{1,c_i}, \ldots, x_{nx,c_i}, y_{0,c_i}, y_{1,c_i}, \ldots, y_{ny,c_i}) = (x_{0,c_{i-1}}, x_{1,c_{i-1}}, \ldots, x_{nx,c_{i-1}}, y_{0,c_{i-1}}, y_{1,c_i}, \ldots, x_{ny,c_{i-1}})$; and r) concatenating the appropriate bits of the x-coordinates $x_{0,c}, x_{1,c}, \ldots, x_{nx,c}$, the y-coordinates $y_{1,c}, \ldots, y_{ny,c}$ and a sign bit of $y_{0,c}$ of the hash point $(x_{0,c_u}, x_{1,c_u}, \ldots, x_{nx,c_u}, y_{0,c_u}, y_{1,c_u}, \ldots, y_{ny,c_u})$, and the appropriate bits of the x-coordinates $x_{0,Tc}, x_{1,Tc}, \ldots, x_{nx,Tc}$, the y-coordinates $y_{1,Tc}, \ldots, y_{ny,Tc}$ and a sign bit of $y_{0,Tc}$ of the hash point $(x_{0,Tc_u}, x_{1,Tc_u}, \ldots, x_{nx,Tc_u}, \sqrt{\alpha}y_{0,Tc_u}, y_{1,Tc_u}, \ldots, y_{ny,Tc_u})$ to form the hash bit string.

8. The method of generating cryptographic hash functions as recited in claim 7, wherein the maximum block size that can be embedded into the $(nx+1)$ x-coordinates and the ny y-coordinates is $(nx+ny+1)$N bits.

9. The method of generating cryptographic hash functions as recited in claim 8, wherein the number of $(nx+ny+1)$N bit blocks in the message bit string is $(u+1)$.

10. The method of generating cryptographic hash functions as recited in claim 9, wherein said step of embedding comprises the steps of:

a) establishing integers M and L, and dividing the message bit string into M-bit strings such that $((nx+ny+1)N-L) > M > (N-L)$;

b) dividing each M-bit string into $(nx+ny+1)$ strings $mx_0, mx_1, \ldots, mx_{nx}, my_1, \ldots, my_{ny}$, wherein the length of the string $mx_0$ is less than or equal to $(N-L)$ bits, and the length of each of the remaining $(nx+ny)$ strings $mx_1, \ldots, mx_{nx}, my_1, \ldots, my_{ny}$ are each less than or equal to N bits, wherein each one of the $(nx+ny+1)$ bit strings has an equivalent value which is an element of the finite field F;

c) assigning the value of the bit strings of $mx_1, \ldots, mx_{nx}$ to $x_1, \ldots, x_{nx}$;

d) assigning the value of the bit strings of $my_1, \ldots, my_{ny}$ to $y_1, \ldots, y_{ny}$;

e) assigning the value of the bit string of $mx_0$ to $x_0$;

f) substituting the values of $x_0, x_1, \ldots, x_{nx}$ and $y_1, \ldots, y_{ny}$ in the selected elliptic polynomial equation with (nx+1) x-coordinates and (ny+1) y-coordinates to form a quadratic equation in $y_0$ of the form $y_0^2+Ay_0+B=0$, wherein A and B are variables; and g) if the quadratic equation in $y_0$ has solutions $\bar{y}_{0,1}, \bar{y}_{0,2}$ where the solutions are elements of the finite field F, then assigning one of the solutions to $y_0$, and the message point is given by $(x_{0,m}, x_{1,m}, \ldots, x_{nx,m}, y_{0,m}, y_{1,m}, \ldots, y_{ny,m})$, otherwise, assigning one of the solutions $\sqrt{\alpha}\bar{y}_{0,1}$ & $\sqrt{\alpha}\bar{y}_{0,2}$ to $y_0$, and the message point is given by $(x_{0,m}, x_{1,m}, \ldots, x_{nx,m}, \sqrt{\alpha}y_{0,m}, y_{1,m}, \ldots, y_{ny,m})$.

11. The method of generating cryptographic hash functions as recited in claim 10, wherein the assignment of solutions in the method of embedding includes assignment of solutions using a predetermined public method.

12. The method of generating cryptographic hash functions as recited in claim 11, wherein the step of embedding further includes the step of denoting the message point as $(x_{0,m}, x_{1,m}, \ldots, x_{nx,m}, \sqrt{\alpha}y_{0,m}, y_{1,m}, \ldots, y_{ny,m})$, wherein the point is on the elliptic polynomial if $\alpha_{m_i}=1$, and the point is on the twist if $\alpha_{m_i}=\bar{\alpha}$.

13. A method of generating cryptographic hash functions using elliptic polynomial cryptography in an electronic communication system, comprising the steps of:

a) generating a set of hash function parameters, comprising the steps of:

b) establishing an ((nx+1)+(ny+1))-dimensional Cartesian coordinates system having orthogonal coordinates $x_0, x_1, \ldots, x_{nx}, y_0, y_1, \ldots, y_{ny}$ defined over a finite field F, such that $x_0, x_1, \ldots, x_{nx}, y_0, y_1, \ldots, y_{ny} \in F$, wherein nx and ny are integers establishing an integer number N, wherein the values of the elements of F can be represented in N-bits strings, an elliptic polynomial $EC^{nx+ny+2}$ and a twist of the elliptic polynomial $TEC^{nx+ny+2}$;

c) specifying values of nx and ny, and a set of coefficients $a_{1k}, a_{2kl}, a_{3k}, c_{1lki}, c_{2kl}, c_{3kli}, b_{1l}, b_{2lk}, b_{3lk}, b_{4k}, b_c \in F$, along with a base point on an elliptic polynomial $(x_{0,B}, x_{1,B}, \ldots, x_{nx,B}, y_{0,B}, y_{1,B}, \ldots, y_{ny,B}) \in EC^{xn+ny+2}$ and a base point on the twist of the elliptic polynomial $(x_{0,TB}, x_{1,TB}, \ldots, x_{nx,TB}, \sqrt{\alpha}y_{0,B}, y_{1,TB}, \ldots, y_{ny,TB}) \in TEC^{xn+ny+2}$;

d) disclosing the values of nx and ny, the set of coefficients, the base point on the elliptic polynomial and the base point on the twist as public information;

e) selecting a pair of random number scalars $k_1, k_2$ which are kept secret for a specific hash function to be used;

f) computing the multiplication of the scalar $k_1$ with a point $(x_{0,B}, x_{1,B}, \ldots, x_{nx,B}, y_{0,B}, y_{1,B}, \ldots, y_{ny,B})$ to obtain a scalar multiplication such that: $(x_{0,Pu}, x_{1,Pu}, \ldots, x_{nx,Pu}, y_{0,Pu}, y_{1,Pu}, \ldots, y_{ny,Pu})=k_1(x_{0,B}, x_{1,B}, \ldots, x_{nx,B}, y_{0,B}, y_{1,B}, \ldots, y_{ny,B})$;

g) computing the multiplication of the scalar $k_2$ with a point $(x_{0,TB}, x_{1,TB}, \ldots, x_{nx,TB}, \sqrt{\alpha}y_{0,B}, y_{1,TB}, \ldots, y_{ny,TB})$ to obtain a scalar multiplication such that $(x_{0,TPu}, x_{1,TPu}, \ldots, x_{nx,TPu}, \sqrt{\alpha}y_{0,TPu}, y_{1,TPu}, \ldots, y_{ny,TPu})=k_1(x_{0,TB}, x_{1,TB}, \ldots, x_{nx,TB}, \sqrt{\alpha}y_{0,B}, y_{1,TB}, \ldots, y_{ny,TB})$;

h) disclosing the scalar multiplication points $(x_{0,Pu}, x_{1,Pu}, \ldots, x_{nx,Pu}, y_{0,Pu}, y_{1,Pu}, \ldots, y_{ny,Pu})$ and $(x_{0,TPu}, x_{1,TPu}, \ldots, x_{nx,TPu}, \sqrt{\alpha}y_{0,TPu}, y_{1,TPu}, \ldots, y_{ny,TPu})$ as public information;

i) establishing an integer i and a parameter $S_{mi}$ to represent the (nx+ny+1)N-bit string of the $i^{th}$ message block, and selecting an initial vector $S_{M1}$ to be made public;

j) generating a hash bit string of the message bit string, comprising the following steps:

k) pre-processing the message bit string to obtain a bit string which is a multiple of (nx+ny+1)N-bits;

l) computing a point $(x_{0,S_1}, x_{1,S_1}, \ldots, x_{nx,S_1}, y_{0,S_1}, y_{1,S_1}, \ldots, x_{ny,S_1})$ on the elliptic polynomial by multiplying a scalar integer value $k_{m_0}$ of the (nx+ny+1)N-bit string of an initial block of the message with a point $(x_{0,Pu}, x_{1,Pu}, \ldots, x_{nx,Pu}, y_{0,Pu}, y_{1,Pu}, \ldots, y_{ny,Pu})$, such that $(x_{0,S_1}, x_{1,S_1}, \ldots, x_{nx,S_1}, y_{0,S_1}, y_{1,S_1}, \ldots, y_{ny,S_1})=k_{m_0}(x_{0,Pu}, x_{1,Pu}, \ldots, x_{nx,Pu}, y_{0,Pu}, y_{1,Pu}, \ldots, y_{ny,Pu})$;

m) computing a point $(x_{0,TS_1}, x_{1,TS_1}, \ldots, x_{nx,TS_1}, \sqrt{\alpha}y_{0,TS_1}, y_{1,TS_1}, \ldots, y_{ny,TS_1})$ on the twist of the elliptic polynomial by multiplying a scalar integer value $k_{m_1}$ of the (nx+ny+1)N-bit string of the next block of the message with a point $(x_{0,TPu}, x_{1,TPu}, \ldots, x_{nx,TPu}, \sqrt{\alpha}y_{0,TPu}, y_{1,TPu}, \ldots, y_{ny,TPu})$, such that $(x_{0,TS_1}, x_{1,TS_1}, \ldots, x_{nx,TS_1}, \sqrt{\alpha}y_{0,TS_1}, y_{1,TS_1}, \ldots, y_{ny,TS_1})=k_{m_1}(x_{0,TPu}, x_{1,TPu}, \ldots, x_{nx,TPu}, \sqrt{\alpha}y_{0,TPu}, y_{1,TPu}, \ldots, y_{ny,TPu})$;

n) initializing the hash points as $(x_{0,c_1}, x_{1,c_1}, \ldots, x_{nx,c_1}, y_{0,c_1}, y_{1,c_1}, \ldots, y_{ny,c_1})=(x_{0,S_1}, x_{1,S_1}, \ldots, x_{nx,S_1}, y_{0,S_1}, y_{1,S_1}, \ldots, x_{ny,S_1})$, and $(x_{0,Tc_1}, x_{1,Tc_1}, \ldots, x_{nx,Tc_1}, \sqrt{\alpha}y_{0,Tc_1}, y_{1,Tc_1}, \ldots, y_{ny,Tc_1})=(x_{0,TS_1}, x_{1,TS_1}, \ldots, x_{nx,TS_1}, \sqrt{\alpha}y_{0,TS_1}, y_{1,TS_1}, \ldots, y_{ny,TS_1})$;

o) establishing an integer value i and initializing the integer i as i=2, and repeating the following steps p) through s) until all of the message data blocks are processed, and incrementing i at each step:

p) computing the (nx+ny+1)N-bit string $S'_{m_i}$ as $S'_{m_i} = S_{m_i} \oplus S_{m_{i-1}}$;

q) embedding a (nx+ny+1)N-bit string $S_{mi}'$ of the $i^{th}$ block of the message bit string into (nx+1) x-coordinates $X_0, x_1, \ldots, x_{nx}$ and ny y-coordinates $y_1, \ldots, y_{ny}$ of the elliptic message point $(x_{0,m_i}, x_{1,m_i}, \ldots, x_{nx,m_i}, \sqrt{\alpha_{m_i}}y_{0,m_i}, y_{1,m_i}, \ldots, y_{ny,m_i})$ using non-iterative embedding;

r) doubling the points $(x_{0,S_i}, x_{1,S_i}, \ldots, x_{nx,S_i}, y_{0,S_i}, y_{1,S_i}, \ldots, x_{ny,S_i})$ and $(x_{0,TS_i}, x_{1,TS_i}, \ldots, x_{nx,TS_i}, \sqrt{\alpha}y_{0,TS_i}, y_{1,TS_i}, \ldots, x_{ny,TS_i})$, such that: $(x_{0,S_i}, x_{1,S_i}, \ldots, x_{nx,S_i}, y_{0,S_i}, y_{1,S_i}, \ldots, x_{ny,S_i})=2(x_{0,S_{i-1}}, x_{1,S_{i-1}}, \ldots, x_{nx,S_{i-1}}, y_{0,S_{i-1}}, y_{1,S_{i-1}}, \ldots, x_{ny,S_{i-1}})$ and $(x_{0,TS_i}, x_{1,TS_i}, \ldots, x_{nx,TS_i}, \sqrt{\alpha}y_{0,TS_i}, y_{1,TS_i}, \ldots, x_{ny,TS_i})=2(x_{0,TS_{i-1}}, x_{1,TS_{i-1}}, \ldots, x_{nx,TS_{i-1}}, \sqrt{\alpha}y_{0,TS_{i-1}}, y_{1,TS_{i-1}}, \ldots, x_{ny,TS_{i-1}})$;

s) if the message point of the $i^{th}$ block is on the elliptic polynomial, then the hash points are computed using: $(x_{0,c_i}, x_{1,c_i}, \ldots, x_{nx,c_i}, y_{0,c_i}, y_{1,c_i}, \ldots, y_{ny,c_i})=(x_{0,m_i}, x_{1,m_i}, \ldots, x_{nx,m_i}, y_{0,m_i}, y_{1,m_i}, \ldots, y_{ny,m_i})+(x_{0,S_i}, x_{1,S_i}, \ldots, x_{nx,S_i}, y_{0,S_i}, y_{1,S_i}, \ldots, x_{ny,S_i})+(x_{0,m_{i-1}}, x_{1,m_{i-1}}, \ldots, x_{nx,m_{i-1}}, y_{0,m_{i-1}}, y_{1,m_{i-1}}, \ldots, x_{ny,m_{i-1}})$ and $(x_{0,Tc_i}, x_{1,Tc_i}, \ldots, x_{nx,Tc_i}, \sqrt{\alpha}y_{0,Tc_i}, y_{1,Tc_i}, \ldots, y_{ny,Tc_i})=(x_{0,Tc_{i-1}}, x_{1,Tc_{i-1}}, \ldots, x_{nx,Tc_{i-1}}, \sqrt{\alpha}y_{0,Tc_{i-1}}, y_{1,Tc_{i-1}}, \ldots, x_{ny,Tc_{i-1}})$, otherwise, they are computed using: $(x_{0,Tc_i}, x_{1,Tc_i}, \ldots, x_{nx,Tc_i}, \sqrt{\alpha}y_{0,Tc_i}, y_{1,Tc_i}, \ldots, y_{ny,Tc_i})=(x_{0,m_i}, x_{1,m_i}, \ldots, x_{nx,m_i}, \sqrt{\alpha}y_{0,m_i}, y_{1,m_i}, \ldots, y_{ny,m_i})+(x_{0,TS_i}, x_{1,TS_i}, \ldots, x_{nx,TS_i}, \sqrt{\alpha}y_{0,TS_i}, y_{1,TS_i}, \ldots, y_{ny,TS_i})+(x_{0,m_{i-1}}, x_{1,m_{i-1}}, \ldots, x_{nx,m_{i-1}}, \sqrt{\alpha}y_{0,m_{i-1}}, y_{1,m_{i-1}}, \ldots, x_{ny,m_{i-1}})$ and $(x_{0,c_i}, x_{1,c_i}, \ldots, x_{nx,c_i}, y_{0,c_i}, y_{1,c_i}, \ldots, y_{ny,c_i})=(x_{0,c_{i-1}}, x_{1,c_{i-1}}, \ldots, x_{nx,c_{i-1}}, y_{0,c_{i-1}}, y_{1,c_i}, \ldots, x_{ny,c_{i-1}})$; and t) concatenating the appropriate bits of the x-coordinates $x_{0,c}, x_{1,c}, \ldots, x_{nx,c}$, the y-coordinates $y_{1,c}, \ldots, y_{ny,c}$ and a sign bit of $y_{0,c}$ of the hash point $(x_{0,c_u}, x_{1,c_u}, \ldots, x_{nx,c_u}, y_{0,c_u}, y_{1,c_u}, \ldots, y_{ny,c_u})$, and the appropriate bits of the x-coordinates $x_{0,Tc}, x_{1,Tc}, \ldots, x_{nx,Tc}$, the y-coordinates $y_{1,Tc}, \ldots, y_{ny,Tc}$ and a sign bit of $\sqrt{\alpha}y_{0,Tc_u}$ of the hash point $(x_{0,Tc_u}, x_{1,Tc_u}, \ldots, x_{nx,Tc_u}, \sqrt{\alpha}y_{0,Tc_u}, y_{1,Tc_u}, \ldots, y_{ny,Tc_u})$ to form the hash bit string.

14. The method of generating cryptographic hash functions as recited in claim 13, wherein the maximum block size that can be embedded into the (nx+1) x-coordinates and the ny y-coordinates is (nx+ny+1)N bits.

15. The method of generating cryptographic hash functions as recited in claim 14, wherein the number of (nx+ny+1)N bit blocks in the message bit string is (u+1).

16. The method of generating cryptographic hash functions as recited in claim 15, wherein said step of embedding comprises the steps of:

a) establishing integers M and L, and dividing the message bit string into M-bit strings such that ((nx+ny+1)N−L)>M>(N−L);

b) dividing each M-bit string into (nx+ny+1) strings $mx_0$, $mx_1, \ldots, mx_{nx}, my_1, \ldots, my_{ny}$, wherein the length of the string $mx_0$ is less than or equal to (N−L) bits, and the length of each of the remaining (nx+ny) strings $mx_1, \ldots, mx_{nx}, my_1, \ldots, my_{ny}$ are each less than or equal to N bits, wherein each one of the (nx+ny+1) bit strings has an equivalent value which is an element of the finite field F;

c) assigning the value of the bit strings of $mx_1, \ldots, mx_{nx}$ to $x_1, \ldots, x_{nx}$;

d) assigning the value of the bit strings of $my_1, \ldots, my_{ny}$ to $y_1, \ldots, y_{ny}$, e) assigning the value of the bit string of $mx_0$ to $x_0$;

f) substituting the values of $x_0, x_1, \ldots, x_{nx}$ and $y_1, \ldots, y_{ny}$ in the selected elliptic polynomial equation with (nx+1) x-coordinates and (ny+1) y-coordinates to form a quadratic equation in $y_0$ of the form $y_0^2 + Ay_0 + B = 0$, wherein A and B are variables; and g) if the quadratic equation in $y_0$ has solutions $\bar{y}_{0,1}, \bar{y}_{0,2}$ where the solutions are elements of the finite field F, then assigning one of the solutions to $y_0$, and the message point is given by $(x_{0,m}, x_{1,m}, \ldots, x_{nx,m}, y_{0,m}, y_{1,m}, \ldots, y_{ny,m})$, otherwise, assigning one of the solutions $\sqrt{\alpha}\bar{y}_{0,1}$ & $\sqrt{\alpha}\bar{y}_{0,2}$ to $y_0$, and the message point is given by $(x_{0,m}, x_{1,m}, \ldots, x_{nx,m}, \sqrt{\alpha}y_{0,m}, y_{1,m}, \ldots, y_{ny,m})$.

17. The method of generating cryptographic hash functions as recited in claim 16, wherein the assignment of solutions in the method of embedding includes assignment of solutions at random.

18. The method of generating cryptographic hash functions as recited in claim 17, wherein the step of embedding further includes the step of denoting the message point as $(x_{0,m}, x_{1,m}, \ldots, x_{nx,m}, \sqrt{\alpha}y_{0,m}, y_{1,m}, \ldots, y_{ny,m})$, wherein the point is on the elliptic polynomial if $\alpha_{m_i} = 1$, and the point is on the twist if $\alpha_{m_i} = \bar{\alpha}$.

* * * * *